(12) United States Patent
Baggen et al.

(10) Patent No.: US 8,253,353 B2
(45) Date of Patent: Aug. 28, 2012

(54) DRIVING A LIGHT SOURCE

(75) Inventors: Constant Paul Marie Jozef Baggen, Eindhoven (NL); Andries Pieter Hekstra, Eindhoven (NL); Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 195 days.

(21) Appl. No.: 12/668,034

(22) PCT Filed: Jul. 14, 2008

(86) PCT No.: PCT/IB2008/052819
§ 371 (c)(1),
(2), (4) Date: Jan. 7, 2010

(87) PCT Pub. No.: WO2009/010916
PCT Pub. Date: Jan. 22, 2009

(65) Prior Publication Data
US 2010/0188004 A1 Jul. 29, 2010

(30) Foreign Application Priority Data
Jul. 16, 2007 (EP) .................................. 07112524

(51) Int. Cl.
*H05B 37/02* (2006.01)
(52) U.S. Cl. .......................... 315/308; 315/247; 315/360
(58) Field of Classification Search .............. 315/209 R, 315/224–226, 247, 287, 291, 297, 307–308, 315/360
See application file for complete search history.

(56) References Cited

U.S. PATENT DOCUMENTS

| 5,175,507 | A | 12/1992 | Roither | |
|---|---|---|---|---|
| 5,905,406 | A | 5/1999 | Sugden et al. | |
| 6,542,270 | B2 | 4/2003 | Perkins et al. | |
| 6,683,590 | B1 | 1/2004 | Pang et al. | |
| 6,794,831 | B2 | 9/2004 | Leeb et al. | |
| 6,925,261 | B2 | 8/2005 | Haruyama | |
| 7,006,768 | B1 | 2/2006 | Franklin | |
| 7,061,191 | B2 * | 6/2006 | Chitta | 315/307 |
| 7,843,139 | B2 * | 11/2010 | Gawrys et al. | 315/105 |
| 2003/0066945 | A1 | 4/2003 | Muthu et al. | |
| 2004/0247051 | A1 | 12/2004 | Vasana | |
| 2005/0062440 | A1 * | 3/2005 | Lys et al. | 315/291 |
| 2005/0134188 | A1 * | 6/2005 | Lindqvist | 315/149 |
| 2005/0213353 | A1 * | 9/2005 | Lys | 363/17 |
| 2006/0273741 | A1 * | 12/2006 | Stalker | 315/291 |
| 2008/0137182 | A1 * | 6/2008 | That et al. | 359/350 |
| 2008/0272276 | A1 * | 11/2008 | Huang et al. | 250/205 |

FOREIGN PATENT DOCUMENTS

| EP | 1447951 A2 | 8/2004 |
|---|---|---|
| EP | 1635617 A2 | 3/2006 |
| WO | 0213490 A2 | 2/2002 |
| WO | 2006111930 A2 | 10/2006 |
| WO | 2008032236 A2 | 3/2008 |

\* cited by examiner

*Primary Examiner* — Tung X Le
(74) *Attorney, Agent, or Firm* — Mark L. Beloborodov

(57) ABSTRACT

A method for driving a light source (11, 12, 13) is described, wherein the light source is alternately switched ON and OFF in an ON/OFF pattern, wherein the duty cycle of the ON/OFF pattern is varied to vary the average light intensity of the light source, and wherein the shape of the ON/OFF pattern is varied to transmit data. Thus, a control signal for the light source comprises data information as well as duty cycle information. The duty cycle is varied within a range from almost zero to almost 100%, and data is varied and transmitted without affecting the duty cycle.

36 Claims, 23 Drawing Sheets

$$IP(FS \cdot S_i) = \frac{T_C \cdot H}{2}$$

$$IP(FS \cdot S_i) = -\frac{T_C \cdot H}{2}$$

$$\begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix}$$

FIG. 18A $$\begin{pmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{pmatrix} \begin{matrix} \\ \leftarrow 2 \\ \leftarrow 3 \\ \\ \\ \\ \\ \leftarrow 8 \end{matrix}$$

FIG. 18B

DRIVING A LIGHT SOURCE

FIELD OF THE INVENTION

The present invention relates in general to methods and devices for driving light sources, more particularly LEDs. In a particular embodiment, the invention relates to a method for driving a plurality of LEDs in such a way that a detector receiving light from said plurality of LEDs can recognize the contribution of each individual LED.

BACKGROUND OF THE INVENTION

A recent development in the field of illumination relates to colour control and brightness control of light sources. Although this technology can in principle be applied to several types of light sources, LEDs are mostly used for this purpose. Since colour control and brightness control of LEDs is known per se, only a brief explanation will suffice here.

LEDs have been developed for generating single-colour light. With a light source comprising three LEDs of mutually different colours, it is possible to generate a light mixture having a colour point in a colour space within a triangle of which the corner points are defined by the individual LED colours. The location of this colour point can be varied by varying the relative average intensities of the individual light contributions. The brightness can be varied by varying the intensities of the individual light contributions to the same extent, keeping the relative average intensities constant. It is noted that one light source may actually comprise multiple LEDs of one and the same colour in order to increase the light output for that colour. A light source of this type comprises in general a driver having an input for receiving a control signal, indicating the required colour and brightness, and having outputs for driving the individual LEDs. On the basis of the received control signal, such driver determines how to drive the individual light sources.

Basically, colour control and brightness control of a light source relies on intensity control of the constituting LEDs. Therefore, in the following the present invention will be specifically explained for intensity control of LEDs, keeping in mind that the present invention is more generally applicable to intensity control of light sources.

Stated briefly, an LED is driven by causing an electric current to flow through the LED. It is possible to use a voltage source but, in view of the fact that light output is proportional to current, it is more suitable to use a current source. The most straightforward manner for varying the light output would be to vary the current level. Changing the current level, however, is not suitable, if only for reason that the output colour may depend on the current level. Therefore, it is common practice to apply duty cycle control. In such case, the LED is switched ON and OFF at a certain switching frequency. In the OFF state, the LED current is zero or almost zero, and the LED produces no light or at least substantially no light. In the ON state, the LED current is maintained substantially constant, thus the light output is maintained substantially constant. The repetition period of the ON/OFF pattern is indicated as current period. The ratio of the ON-duration and the current period is indicated as the duty cycle. The duty cycle determines the average lamp current and hence the average light output. The switching frequency is a design parameter, which should not be chosen too low in order to avoid visible flicker, and which also should not be chosen too high in order to avoid too much switching losses, while further the switching frequency should be within the bandwidth of the driver/LED combination. It is noted that, keeping the lamp current at a fixed level, the average light output is at a maximum when the duty cycle is equal to 1 (i.e. 100%).

In a more recent development, an illumination system comprises a plurality of LEDs distributed over a space, such as a room. It is possible that all LEDs are driven in the same manner, such that the colour and brightness conditions are the same all over the room. However, it would be desirable to be able to independently set the colour and brightness conditions in different sections of the room. A control system for such illumination system may comprise a light sensor, that can be positioned at a certain location, generating a signal that represents the local colour and brightness conditions, and a central controller may amend the control signals for the LEDs of the illumination system such that the required local colour and brightness conditions at the location of the sensor are met. For such operation, the control system needs to know which LEDs contribute to the illumination at that location, and to which extent. In order to be able to determine the identity of the LEDs contributing to the illumination at a sensor location, it would be desirable that the light output of a specific LED contains a code identifying that specific LED.

Incorporating such code in the light output can be done by amplitude modulation of the LED current of the ON state but, as mentioned before, it is preferred that the LED current in the ON state is maintained constant.

Another method for incorporating such code in the light output is switching the LEDs ON and OFF in a certain pattern, the pattern defining a series of "0"s and "1"s of a binary code. Now, the problem arises how the duty cycle switching can be suitably combined with the coded switching, especially in such a way that the code does not interfere with the illumination function.

In an illumination system as described above, i.e. comprising a plurality of LEDs distributed over a space, it is possible that the spacing between LEDs is such that a sensor would only receive light from one LED at a time. However, it is also possible, and in cases with substantially homogenous illumination it is even very likely, that a single sensor (photo detector) would receive light from two or more LEDs simultaneously. In the case of coded switching, the sensor would receive two or more coded signals at the same time, that would interfere with each other. Thus, the problem arises of performing the coded switching in such a way that individual signals from individual LEDs can be reliably distinguished.

On the other hand, the present invention does not necessarily relate to a plurality of LEDs. Even in an illumination system comprising only one single LED, it may be desirable to combine duty cycle control for colour and/or brightness variations with coded switching for data communication. Apart from transmitting an identifying code, it is desirable to use the illumination in a room for data communication to one (or more) user(s) in the room. For instance, the data communicated in this way may contain audio and/or video information. For such applications, a very high data rate would be desirable.

SUMMARY OF THE INVENTION

It is noted that duty cycle switching of LEDs in order to vary the light output is known per se, but without emitting data. It is further noted that coded switching of LEDs in order to emit data is known per se, but without duty cycle variations to vary the light intensity.

An objective of the present invention is to provide a method for driving an LED such that duty cycle switching can be suitably combined with coded switching without the one affecting the other.

A further objective of the present invention is to provide a method for driving an LED with a combination of coded switching and duty cycle control such that the signal spectrum contains only a small contribution of low-frequency signals, not considering the DC component, in order to avoid visible flicker.

A further objective of the present invention is to provide a method for driving an LED with a combination of coded switching and duty cycle control such that a high data rate is achieved.

A further objective of the present invention is to provide a method for driving an LED with a combination of coded switching and duty cycle control such that, in a case of multiple LEDs, individual signals from individual LEDs can easily be distinguished.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which:

FIG. 18A shows a Hadamard matrix of order 8;

FIG. 18B shows a code word matrix derived from the Hadamard matrix of FIG. 18A;

DETAILED DESCRIPTION OF THE INVENTION

Figure 1:
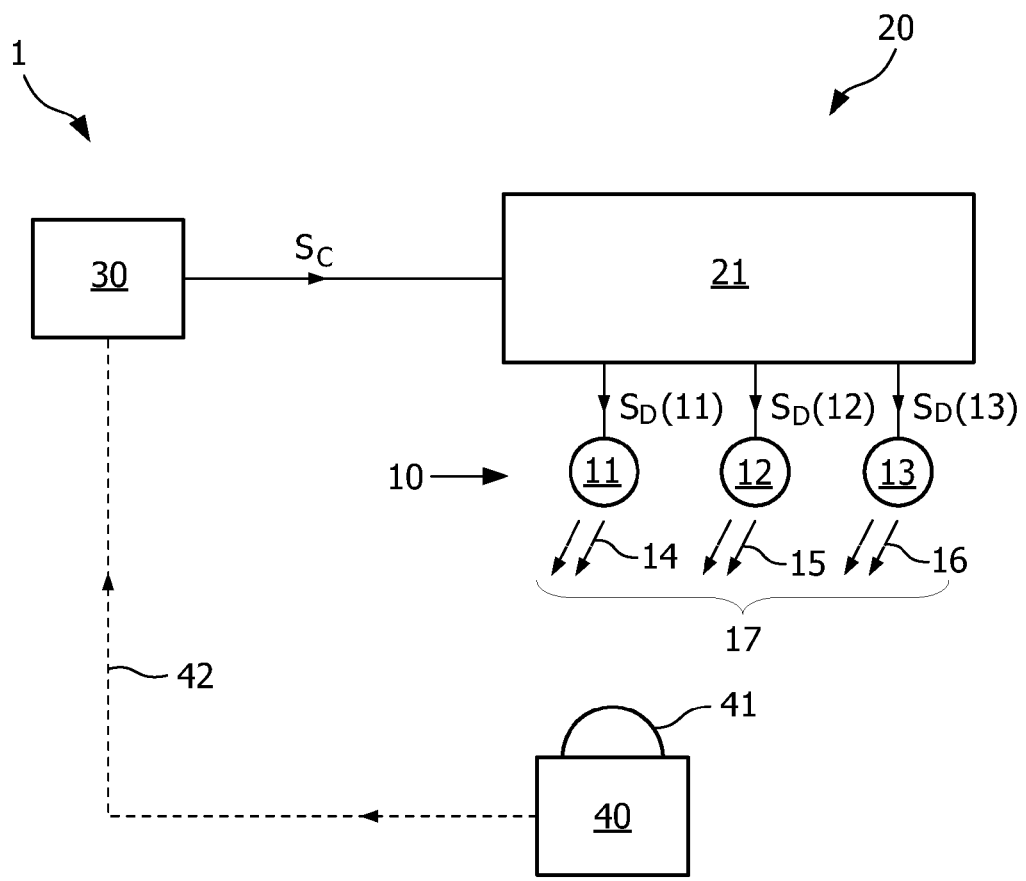
FIG. 1 is a block diagram schematically illustrating an illumination system.

FIG. 1 is a block diagram schematically illustrating an illumination system 1 embodying the present invention by way of example. The illumination system 1 comprises at least one illumination unit 20. It is noted that the illumination system 1 may comprise a plurality of illumination units 20, but the figure only shows one illumination unit 20.

The illumination unit 20 comprises a light source 10. It is noted that the illumination unit 20 may comprise a plurality of light sources, but the figure only shows one light source 10. In this example, the light source 10 comprises three LEDs 11, 12, 13, for generating light 14, 15, 16, respectively, of mutually different colours, for instance red, green, blue, so that the combined light output 17 of this light source 10 can have a variable colour point. It is noted that, for increasing the light output, the light source 10 may comprise a plurality of LEDs having mutually the same colour. It is further noted that the light source 10 may comprise only one single LED, if the single LED is capable of colour variation by itself or if colour variation is not required, or the light source 10 may comprise more than three LEDs of mutually different colours.

The illumination unit 20 further comprises a source driver 21 generating suitable driving signals $S_D(11), S_D(12), S_D(13)$ for the light source 10, such that the required light output is achieved. The requirements of the light output include colour and brightness. Command signals $S_C$ for communicating the required colour and brightness to the source driver 21 are generated by a central controller 30, which also generates such control signals for other illumination units if present. It is noted that, in case the illumination system 1 only comprises one illumination unit 20, the source driver 21 and the central controller 30 may be integrated.

The figure further shows a receiving device 40, comprising a light sensor 41. In a particular embodiment, the receiving device 40 may be designed to communicate to the central controller 30 information regarding the received light, either through a wired or a wireless link, as indicated by reference numeral 42, such as to provide a feedback loop for the central controller 30 so that it can adapt its control signals. This applies particularly in relation to the control of colour and brightness.

As will be explained in more detail later, the light output 17 of the light source 10 contains coded data. This coded data may identify individual light sources 10 in a multi-source illumination system 1, or may identify the individual LEDs 11, 12, 13, so that the central controller 30 can detect which LED contributes to the light received by the receiving device 40 and it can suitably adapt its command signal $S_C$ for that specific light source 10.

It is also possible that the coded data contains audio and/or video information, and that the receiving device 40 is an audio and/or video player (in which case the feedback link 42 may be absent).

Since LEDs, drivers for LEDs, controllers for controlling drivers, and light sensors for receiving light are known per se, a detailed general description of design and functioning thereof will be omitted here.

In the above, control of the light source 10 has been described with a view to colour control. In a light source comprising two or more mono-colour LEDs, colour control actually involves intensity control of the individual LEDs. The basic idea of the present invention is not restricted to colour control in a multi-colour system, but is also applicable to brightness control in a single-colour system, even a single-LED system. Therefore, in the following the focus of the explanation will concentrate on the issue of driving a single LED.

Figure 2A:
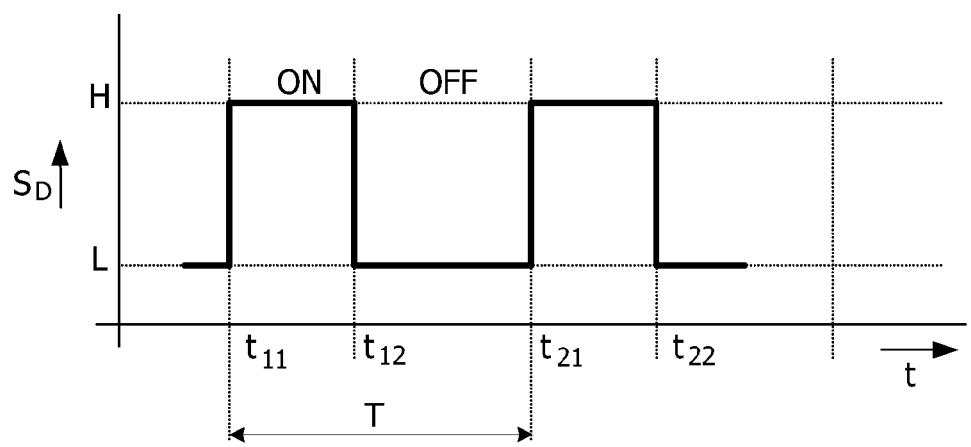
FIG. 2A is a schematic timing diagram of a drive signal for an LED.

FIG. 2A is a timing diagram of a drive signal $S_D$ for an LED. The horizontal axis represents time, the vertical axis represents the value of the drive signal $S_D$. It can be seen that the drive signal $S_D$ can only take two values, which are indicated L (low) and H (high). Whenever the drive signal $S_D$ is low, the LED current is substantially zero and the LED is substantially OFF. Whenever the drive signal $S_D$ is high, the LED current has a predetermined constant value and the LED is ON. Thus, the shape of the curve representing drive signal $S_D$ also represents the LED current and the light output as a function of time.

Normally, the drive signal $S_D$ is a periodic signal having a period T from $t_{11}$ to $t_{21}$. In the example of FIG. 2A, the drive signal $S_D$ goes HIGH on time $t_{11}$ and goes LOW on time $t_{12}$, defining an ON-duration $t_{ON}=t_{12}-t_{11}$ and an OFF-duration $t_{OFF}=t_{21}-t_{12}$. A duty cycle $\Delta$ is defined as the proportion of the ON-duration $t_{ON}$ in relation to the signal period T according to $\Delta=t_{ON}/T$. Calculated on a time scale much larger than the period T, the average lamp current and the average light output are proportional to the duty cycle $\Delta$. Thus, brightness control of an LED can be performed by varying the duty cycle $\Delta$, i.e. the time $t_{12}$, assuming that the signal period T is maintained constant. Irrespective of the brightness, the current (if flowing) will always have the same value, which may be set such that the efficiency and/or colour of the LED is optimal.

It is noted that the rapid succession of ON/OFF switching of the LED can result in noticeable flicker if the switching frequency is too low. In practice, the switching frequency may be chosen in the kHz range or higher to avoid this problem. On the other hand, the switching process itself takes time and consumes energy, so the switching frequency may not be chosen too high.

Figure 2B:
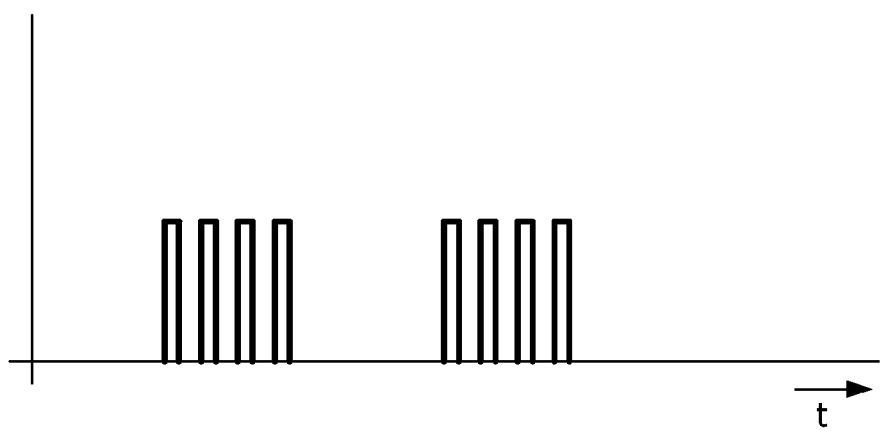
FIG. 2B is a schematic timing diagram showing a pulsed data signal for communicating a code.

For the purpose of communicating a code, it is generally known per se to modulate light. For instance, an infrared remote controller emits light that is modulated or rapidly switched ON/OFF, so that the light output as a function of time shows a rapid succession of light pulses, as illustrated in FIG. 2B. In these pulses, information can be coded in several ways: for instance, pulse width modulation or pulse distance modulation are possibilities.

It is also known per se to amplitude modulate the light output from a lamp which is continuously ON, in order to be able to detect in which position a detector is located. A simple detection scheme would include a plurality of lamps, each being modulated with a specific fixed frequency. Thus, the demodulated frequency of a light detector output signal would correspond to the modulation frequency of the lamp whose light is received and would hence indicate the identity of the emitting lamp. For distributing information, it would be possible that the amplitude modulation is performed with an audio signal, so that the demodulated signal can be reproduced with a loudspeaker, like a radio system. Typically, the average light intensity of such lamp remains constant on a time scale larger than the modulation frequency. If brightness control is required (dimming), this is typically performed in the analogue manner by changing the lamp current level.

Figure 2C:
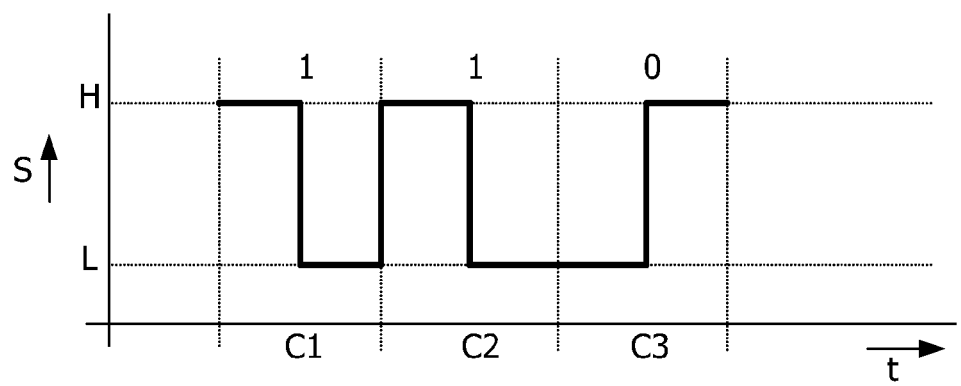
FIG. 2C is a schematic timing diagram illustrating bi-phase modulation.

It is further noted that, in the field of digital signal communication, it is known to use bi-phase modulation to determine the difference between a logical "1" and a logical "0". This is schematically illustrated in FIG. 2C. A digital signal S can take two signal values L and H. The signal S is subdivided into signal cells C1, C2, C3 of equal duration, each cell representing one code bit. Each cell is divided in two segments of equal duration. Within one cell, the signal S is either HIGH in the first segment and LOW in the second segment, indicated as HL (see cells C1 and C2), or vice versa, indicated as LH (see cell C3). The two possibilities HL and LH define a logical "1" and a logical "0", respectively.

However, if this known technique were incorporated in an illumination system as described above, it should be clear that the duty cycle of the light output would necessarily always be equal to 50%.

Further, in this known technique, each cell contains only one bit of data, i.e. either a "0" or a "1".

The present invention aims to combine digital communication and duty cycle control in one signal, in such a way that the duty cycle can be controlled entirely independently from the digital data.

Further, the present invention aims to provide a method for processing a received light signal in such a way that the digital data and the duty cycle can be determined reliably and independently from each other.

Figure 3A:
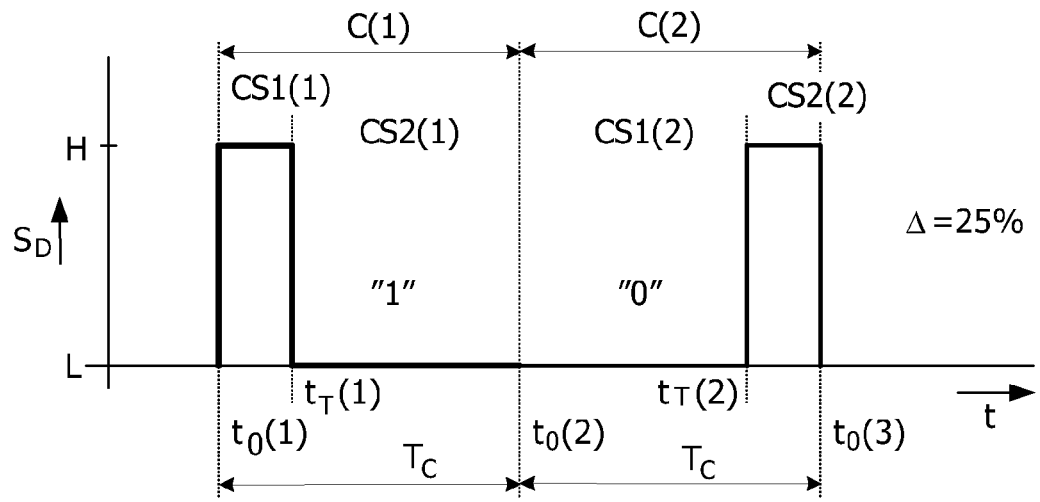
FIG. 3A is a schematic timing diagram illustrating an embodiment of a drive signal according to the present invention.

FIG. 3A is a graph, comparable to FIG. 2C, of a drive signal $S_D$ proposed by the present invention. Again, the signal is divided into time cells, indicated as C(1), C(2), etc, each time cell representing a digital bit. The cells have mutually equal duration $T_C$, which can be determined by a clock signal (not shown for sake of simplicity). Again, each time cell C(i) is subdivided in two consecutive cell segments CS1(i), CS2(i). Again, the signal $S_D$ can have two signal values H and L only, the signal value in the second cell segment CS2(i) always being the opposite of the signal value in the first cell segment CS1(i). The cell segment having value H will be indicated as H-segment while the other segment will be indicated as L-segment. Thus, either the first cell segment CS1(i) is H while the second cell segment CS2(i) is L, which applies to first cell C(1) in FIG. 3A, or the second cell segment CS2(i) is H while the first cell segment CS1(i) is L, which applies to second cell C(2) in FIG. 3A. The value of the first cell C(1) will be indicated as HL, while the value of the second cell C(2) will be indicated as LH. These two different values define a digital 0 and a digital 1, respectively, it being immaterial whether HL indicates 0 and LH indicates 1 or the other way around.

In FIG. 3A, the first cell C(1) starts at $t_0(1)$ and the second cell C(2) starts at $t_0(2)$, so the cell duration $T_C$ is equal to $t_0(2)-t_0(1)$. The transition time between the two consecutive cell segments CS1(i), CS2(i) is indicated as $t_T(i)$. In each cell C(i), the duration t1(i) of the first cell segment CS1(i) is equal to $t_T(i)-t_0(i)$ while the duration t2(i) of the second cell segment CS2(i) is equal to $t_0(i+1)-t_T(i)$. In each cell C(i), a duty cycle Δ(i) is defined as the proportion of the duration of the H-segment to the cell duration $T_C$. Thus, in the case of the first cell C(1) the duty cycle $Δ(1)=t1(1)/T_C$ applies, while in the case of the second cell C(2) the duty cycle $Δ(2)=t2(2)/T_C$ applies.

Thus, the signal contains data as well as duty cycle information.

Figure 3B:
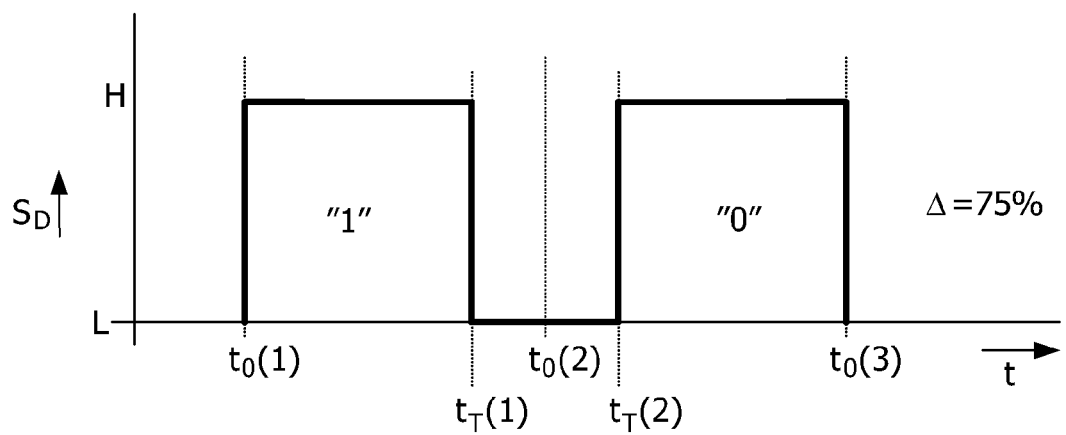
FIG. 3B is a schematic timing diagram illustrating an embodiment of a drive signal according to the present invention.

In FIG. 3A, the duty cycle of the signal is smaller than 50%, namely approximately equal to 25%. FIG. 3B is comparable to FIG. 3A, but now the duty cycle of the signal is larger than 50%, namely approximately equal to 75%. Again, digital bits "0" and "1" are clearly defined by the cell value HL and LH, respectively.

From the above explanation, it should be clear that the duty cycle of the signal (and thus the average intensity of emitted light) can be varied over a large range without disturbing the data content, while conversely the data content can be selected freely without disturbing the duty cycle (and the average intensity). In other words, data content and duty cycle (or average intensity) are independent from each other.

It is noted that, in the above explanation, the duration t1 of the first cell segments CS1 is not constant: the duration of the H-segments is constant, but such segment may be the first cell segment or the second cell segment, depending on whether the cell data is a "1" or a "0". Another way of describing the above would be by saying that each cell contains the combination of one H-segment of a specified duration tH and one L-segment of a specified duration tL=tT−tH, wherein tH and tL are constant, and wherein either the H-segment is the first segment or the L-segment is the first segment. Yet another way of describing the above would be by saying that each cell is subdivided into THREE segments: a first segment of a duration tx<Tc, a second segment of duration Tc−2tx, and a third segment of duration tx, wherein the first segment is a H-segment and the third segment is an L-segment for cell data "1" or vice versa for cell data "0", and wherein the second segment is either H or L depending on the duty cycle being more than 50% or less than 50% without influencing the cell data.

The signals illustrated in FIGS. 3A-B are the drive signals $S_D$ driving the LED, but it should be clear that the light output of the LED follows the same curve, and also that an output signal of a sensor 41 receiving this light output will basically follow the same curve, albeit perhaps with some noise and/or interference caused by the surroundings, for instance by other light sources. A further aspect of the present invention relates to the problem of analysing the received signal, i.e. the sensor output signal. In the following explanation, it is assumed that the output signal of sensor 41 is communicated to central controller 30 (feedback link 42), and that the central controller 30 on the one hand is designed to decode the data content of the signal and on the other hand is designed to measure the peak intensity of the light as received by the sensor. Alternatively, a separate decoder could be provided in the receiving device 40, for instance.

For analysing the detection signal, the present invention proposes to use matched filters. Matched filters for analysing digital signals are known per se. Basically, such filter contains a preprogrammed waveform, and it correlates the received signal to be analysed with the preprogrammed waveform; its output signal has a value indicating the amount of correlation between the received signal and the preprogrammed waveform. This output correlation value indicates how much of the received signal corresponds to the preprogrammed waveform of the filter. From comparing this output correlation value with a threshold, a YES/NO decision can be made as to whether or not the received signal contains the preprogrammed waveform of the filter. This operation will be briefly explained with reference to FIGS. 4A-D, where the preprogrammed waveform will be briefly indicated as "filter shape" FS.

Figure 4A:
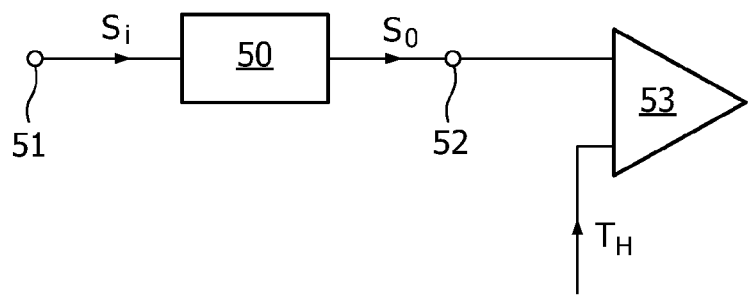
FIG. 4A is a block diagram for illustrating a matched filter.

FIG. 4A schematically shows a matched filter 50, having an input 51 for receiving an input signal Si to be analysed, and having an output 52 for providing an output signal So. The input signal Si to be analysed is a signal with predetermined time cells having cell duration Tc. The filter 50 is intended for analysing bi-phase modulated signals as explained with reference to FIG. 2C, and has a filter shape FS illustrated in FIG. 4B, having a value +1 from time t=0 to 0.5Tc and a value −1 from time t=0.5Tc to Tc. The filter 50 is designed to calculate its output signal So according to an inner product operation So=IP(FS·Si), which is defined as taking the product FS(t)·Si(t) for each value of the time between 0 and Tc and integrating this over the range from 0 to Tc.

Figure 4B:
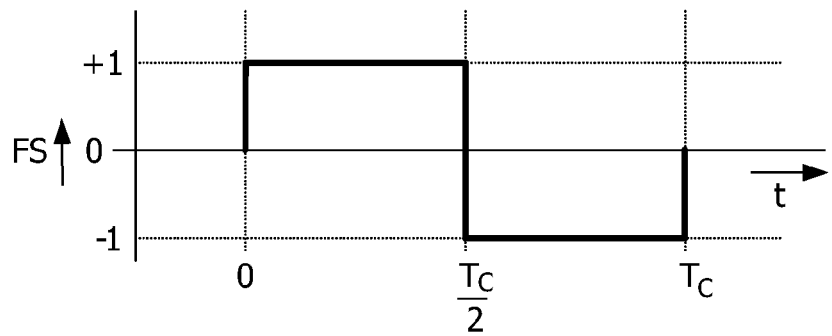
FIG. 4B is a schematic timing diagram illustrating an exemplary preprogrammed waveform (filter shape) of the matched filter.
Figure 4C:
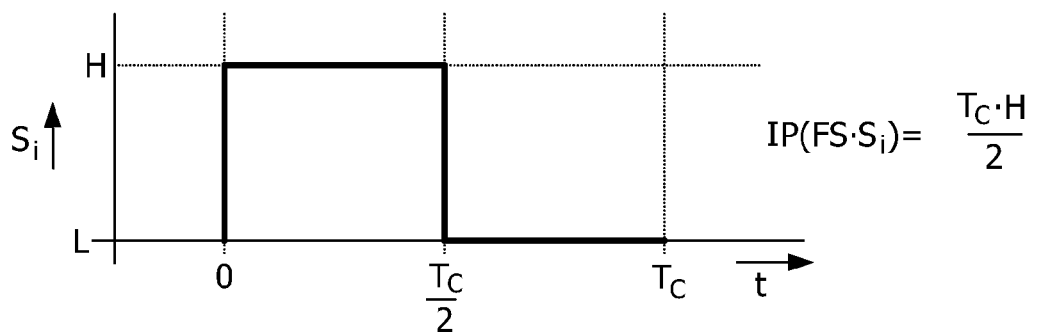
FIG. 4C is a schematic timing diagram of an exemplary signal to be analysed by the matched filter of FIG. 4A, for illustrating the operation of the matched filter.

FIG. 4C illustrates what happens in case the input signal Si contains an HL cell C1 as illustrated in FIG. 2C; in the following explanation, low level L will be considered equal to zero. For each moment in time between t=0 and t=0.5·Tc, the input signal has the value H and the filter shape FS has value +1, so the product FS(t)·Si(t)=H for these times. For each moment in time between t=0.5·Tc and t=Tc, the input signal has the value zero and the filter shape FS has value −1, so the product FS(t)·Si(t)=0 for these times. Integrating this product over the range from 0 to Tc yields So=0.5·Tc·H.

Figure 4D:
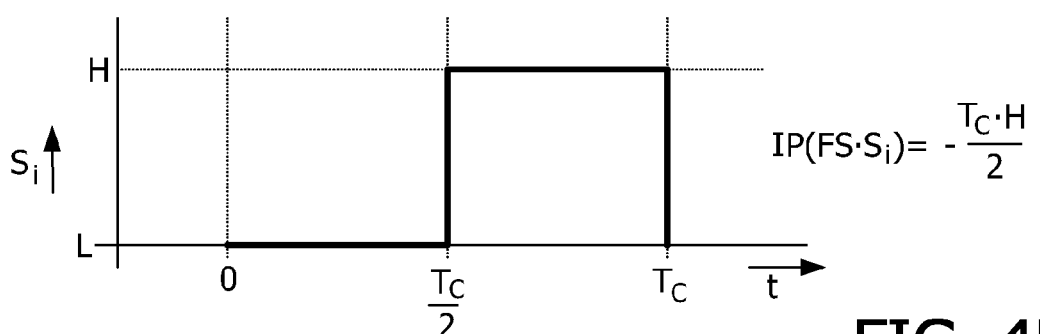
FIG. 4D is a schematic timing diagram of an exemplary signal to be analysed by the matched filter of FIG. 4A, for illustrating the operation of the matched filter.

FIG. 4D illustrates what happens in case the input signal Si contains an LH cell C3 as illustrated in FIG. 2C. For each moment in time between t=0 and t=0.5·Tc, the input signal has the value zero and the filter shape FS has value +1, so the product FS(t)·Si(t)=0 for these times. For each moment in time between t=0.5·Tc and t=·Tc, the input signal has the value H and the filter shape FS has value −1, so the product FS(t)·Si(t)=-H for these times. Integrating this product over the range from 0 to Tc yields So=-0.5·Tc·H.

FIG. 4A further shows that the filter output signal So can be provided to a comparator 53, which compares the filter output signal So with a predefined threshold level TH. A suitable value for the threshold level TH in the above example would be zero. If the comparator 53 finds that the signal So is above zero, it decides to output a digital "1"; if the comparator 53 finds that the signal So is below zero, it decides to output a digital "0".

Referring to the example of FIG. 4C, in case the input signal Si is disturbed by noise or attenuation, such that, at some time in the first half of the signal period, the signal value is less than H, the contribution to the integrated output signal becomes less, i.e. the value of the output signal So decreases. Likewise, in case at some time in the second half of the signal period, the signal value is above zero, a negative contribution to the integrated output signal results, so that the value of the output signal So decreases also. Nevertheless, as long as the output signal So is above zero, the input signal Si will be recognized as an HL signal, decoded as "1", based on the assumption that this is more likely than the input signal Si being an LH signal coding for "0". It is noted that this "decoding" is based on information that the input signal can have only one out of two possible shapes, and on information defining those two possible shapes.

From the above it follows that the filter shape FS illustrated in FIG. 4B is the most suitable shape for decoding the biphase coded signal of FIG. 2C (NB: the same would apply to a filter which has the inverted filter shape). The signal is expected to take only one of two possible waveforms, and the filter output So has maximum absolute values in the case of the input signal being exactly equal to one of two expected waveforms. In general, in case a signal to be analyzed can take only one of two possible waveforms, it can be shown that the optimal filter shape is obtained by subtracting those two possible waveforms from each other; it can easily be seen that subtracting an LH signal from an HL signal yields the filter shape FS illustrated in FIG. 4B.

With reference to FIGS. 3A and 3B, a problem now is the fact that the signal to be analyzed can take more than only two possible waveforms, since the duty cycle can take any value from almost zero to almost 100%. Only if the duty cycle is known, the signal to be analyzed can take only one of two possible waveforms again (see cells C(1) and C(2) in FIG. 3A), and it would be possible to suitably adapt the filter shape FS (i.e. to tune the filter).

It is noted that the above does not imply that it is impossible to reliably detect the signal codes HL or LH. Using the filter shape FS of FIG. 4B, it should be clear that the cell C(1) of FIG. 3A would result in the filter output So having value So=$t_T$·H while the cell C(2) of FIG. 3A would result in the filter output So having value So=-$t_T$·H. The same would apply to cells C(1) and C(2) of FIG. 3B. Nevertheless, it is desirable to be able to detect the duty cycle.

Unfortunately, it is not possible to directly measure the duty cycle on the basis of the average signal level of input signal Si, in view of the fact that the value H is not fixed but depends, among others, on the distance between LED and sensor.

The present invention provides a method to overcome this problem.

Figure 5A:
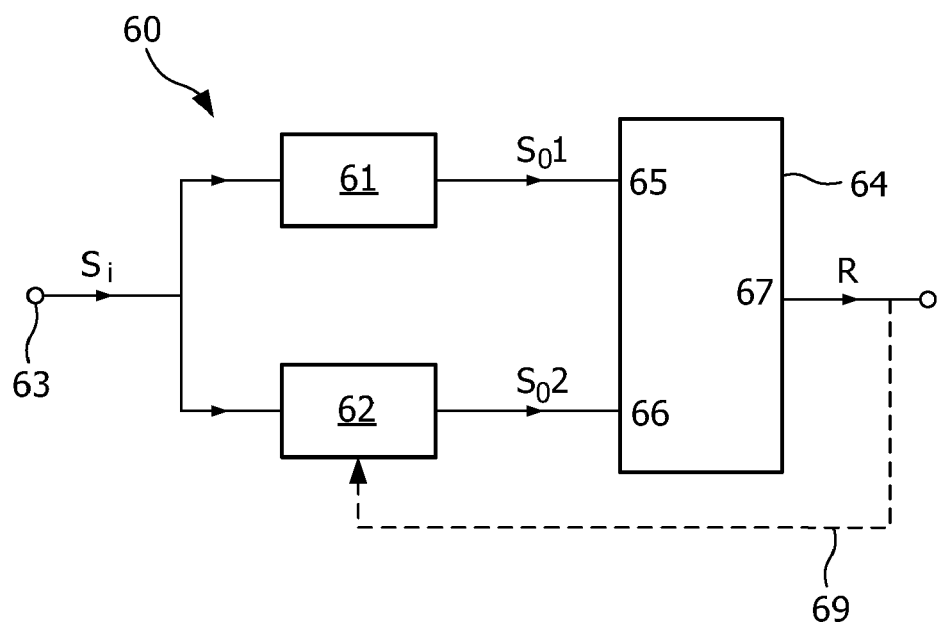
FIG. 5A is a block diagram schematically illustrating a signal decoding circuit.

FIG. 5A is a block diagram schematically illustrating a signal decoding circuit 60, comprising two matched filters 61 and 62 arranged in parallel. The circuit 60 has a circuit input 63 for receiving the signal Si to be analyzed; the two matched filters 61 and 62 have their respective inputs coupled to the circuit input 63, so they both receive the same signal. It is noted that the circuit 60 may comprise an input amplifier, not shown for sake of simplicity. The two matched filters 61 and 62 have filter shapes FS1 and FS2, respectively, which are mutually different.

Figure 5B:
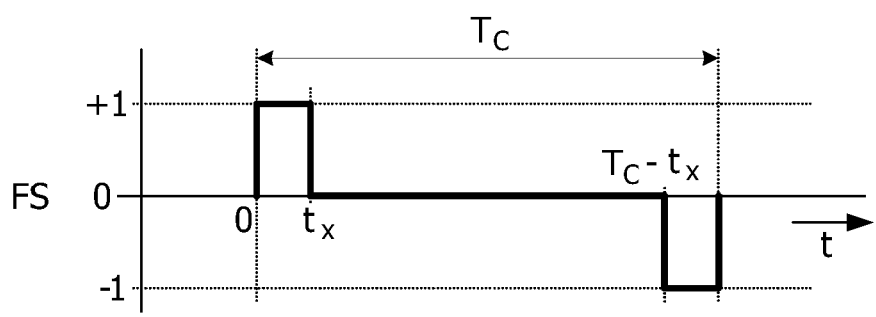
FIG. 5B is a schematic timing diagram comparable to FIG. 4B, illustrating an exemplary preprogrammed waveform (filter shape) of a matched filter of the signal decoding circuit.

FIG. 5B illustrates the general profile of a filter shape. For time t=0 to tx, the filter shape FS has value +1. For time t=(Tc−tx) to Tc, the filter shape FS has value −1. Between times tx and (Tc−tx), the filter shape FS has value 0. As explained above, such filter shape is optimal for decoding a signal having a duty cycle Δ=tx/Tc. Therefore, in the following, this filter shape will be referred to by the value of the duty cycle Δ. Thus, the filter shape of FIG. 4B will be indicated as a 50% filter shape, and a matched filter having this filter shape will be indicated as a 50% filter. Further, it will be said that the filter has a duty cycle value Δ.

The two matched filters 61 and 62 of the signal decoding circuit 60 have mutually different duty cycle values Δ1 and Δ2, respectively. Although not essential, it is preferred that one of the filters has duty cycle value 50%; therefore, in the exemplary embodiment of FIG. 5A, the first matched filter 61 is a 50% filter (see FIG. 4B). The second matched filter 62 has a duty cycle value Δ2 smaller than Δ1; by way of example, the second duty cycle value Δ2 may be as low as 0.1% (for sake of clarity, Δ2 is exaggerated in FIGS. 5B-5D).

Figure 5C:
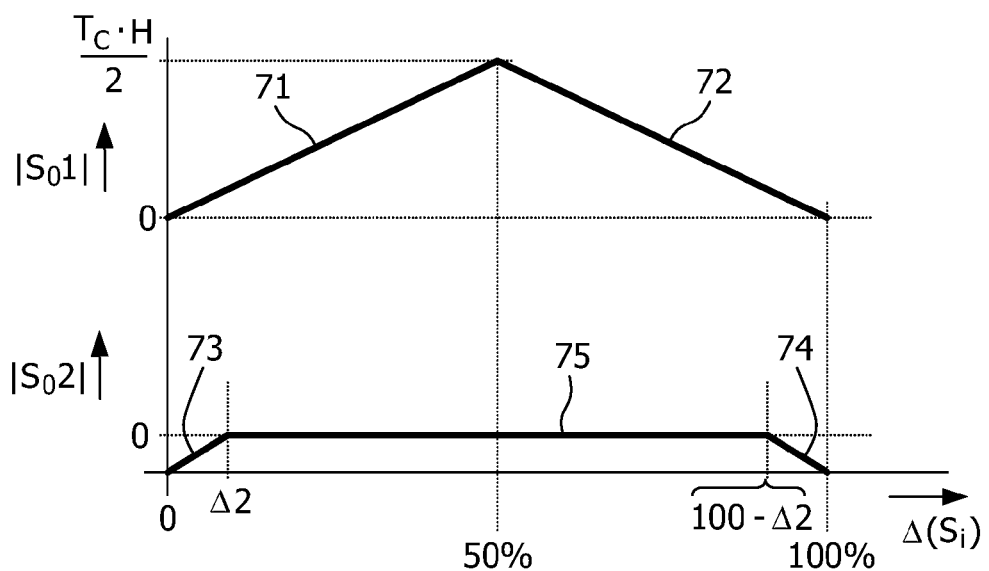
FIGS. 5C-D are graphs for illustrating the operation of the signal decoding circuit of FIG. 5A.

FIG. 5C is a graph showing the absolute value of the output signals So1 and So2 of the first and second matched filters 61, 62, respectively (vertical axis) as a function of the duty cycle Δ(Si) of the input signal Si to be analyzed. Referring to the above explanation, the absolute value |So1| of the output signal So1 of the first matched filter 61 has a maximum value |So1|=0.5·Tc·H if the duty cycle Δ(Si) of the input signal Si is equal to 50%. If the duty cycle Δ(Si) of the input signal Si is less than 50%, the absolute value |So1| of the output signal So1 of the first matched filter 61 is also less. More specifically, if the duty cycle Δ(Si) of the input signal Si is between 0 and 50%, the absolute value |So1| of the output signal So1 of the first matched filter 61 is proportional to the duty cycle Δ(Si) according to |So1|=Δ(Si)·Tc·H (line portion 71). Likewise, if the duty cycle Δ(Si) of the input signal Si is between 50% and 100%, the absolute value |So1| of the output signal So1 of the first matched filter 61 is inversely proportional to the duty cycle Δ(Si) according to |So1|=(1−Δ(Si))·Tc·H (line portion 72).

With respect to the second matched filter 62, having a duty cycle Δ2 smaller than 50%, it can easily be seen that similar relationships exist. If the duty cycle Δ(Si) of the input signal Si is between 0 and Δ2, the absolute value |So2| of the output signal So2 of the second matched filter 62 is proportional to the duty cycle Δ(Si) according to |So2|=Δ(Si)·Tc·H (line portion 73), whereas, if the duty cycle Δ(Si) of the input signal Si is between 100%−Δ2 and 100%, the absolute value |So2| of the output signal So2 of the second matched filter 62 is inversely proportional to the duty cycle Δ(Si) according to |So2|=(1−Δ(Si))·Tc·H (line portion 74). Since the input signal Si from time Δ2·Tc to time (100%−Δ2)·Tc does not contribute to the output signal So2, the absolute value |So2| of the output signal So2 of the second matched filter 62 does not change if the duty cycle Δ(Si) of the input signal Si is changed between Δ2 and (100%−Δ2), i.e. the absolute value |So2| of the output signal So2 of the second matched filter 62 is constant if the duty cycle Δ(Si) of the input signal Si is between Δ2 and (100%−Δ2) (line portion 75).

This allows a processor 64, having a first input 65 receiving the output signal So1 of the first matched filter 61 and having a second input 66 receiving the output signal So2 of the second matched filter 62, to calculate a signal indicative of the duty cycle $\Delta(Si)$ of the input signal Si by calculating the ratio R of its two input signals according to $R=|So1|/|So2|$. If the duty cycle $\Delta(Si)$ of the input signal Si is between $\Delta 2$ and 50%, said ratio R is equal to $\Delta(Si)/\Delta 2$, thus $\Delta(Si)$ can be calculated according to $\Delta(Si)=R\cdot\Delta 2$. If the duty cycle $\Delta(Si)$ of the input signal Si is between 50% and (100%-$\Delta 2$), said ratio R is equal to $(1-\Delta(Si))/\Delta 2$, thus $\Delta(Si)$ can be calculated according to $\Delta(Si)=1-R\cdot\Delta 2$.

The duty cycle $\Delta(Si)$ is already an important parameter for a central controller 30 or any other receiver. Further, it is possible that the calculated duty cycle $\Delta(Si)$ of the received signal is used to adapt the duty cycle $\Delta 2$ of the second matched filter 62 to be substantially equal to the calculated duty cycle $\Delta(Si)$ of the received signal, such that the process of decoding the data stream contained in the input signal Si is optimized. This tuning of the second matched filter 62 is indicated by dashed line 69 in FIG. 5A. The processor 64 (or a different processor) will take the output signal So2 of the tuned second matched filter 62 as input for detecting "0" and "1" bits encoded in HL and LH cells, respectively.

It is noted here that the receiver needs to know whether the duty cycle is below or above 50%; this information can be contained in the coded data of the signal.

It is further noted that the processor 64 also has sufficient information for being allowed to calculate the maximum possible light output level Smax to be expected at the location of the receiving device 40 according to Smax=$|So2|/\Delta 2$, if the duty cycle $\Delta(Si)$ of the input signal Si is between $\Delta 2$ and (100%-$\Delta 2$).

It is further noted that, instead of relying on the duty cycle being measured, it is possible that the data transmission comprises system information. For instance, data can be transmitted in frames, each frame containing a number of data fields, and one of these data fields can contain information revealing the duty cycle. In such case, the processor 64 can derive the duty cycle $\Delta(Si)$ from the data in the input signal Si, and possibly tune the second filter 62 on the basis of this information.

Figure 5D:
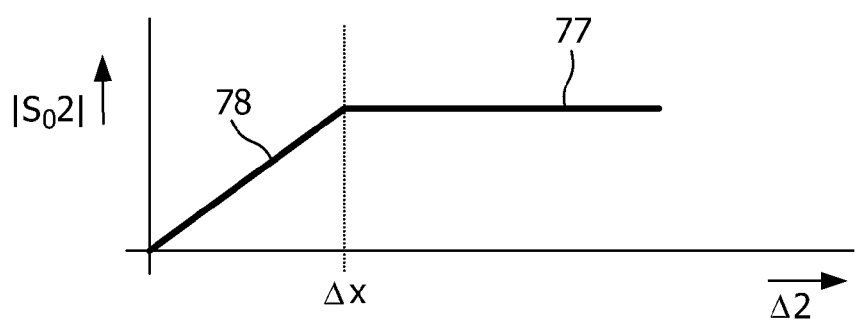

The above method relies on the use of two matched filters 61 and 62. In an alternative method, only one tuneable matched filter 62 is needed. An input signal Si is received, having a specific duty cycle $\Delta(Si)$; assume this duty cycle $\Delta(Si)$ to be lower than 50%. FIG. 5D is a graph, illustrating the absolute value $|So2|$ of the tuneable matched filter 62 (vertical axis) as a function of the duty cycle $\Delta 2$ of the tuneable matched filter 62 (horizontal axis). As long as the duty cycle $\Delta 2$ of the tuneable matched filter 62 is higher than the specific duty cycle $\Delta(Si)$ of the input signal Si, the absolute value $|So2|$ of the output signal So2 of the tuneable matched filter 62 is constant (line portion 77). If the duty cycle $\Delta 2$ of the tuneable matched filter 62 is lower than the specific duty cycle $\Delta(Si)$ of the input signal Si, the absolute value $|So2|$ of the output signal So2 of the tuneable matched filter 62 is proportional to the duty cycle $\Delta 2$ of the tuneable matched filter 62 according to $|So2|=\Delta 2\cdot Tc\cdot H$ (line portion 78).

Thus, the present invention proposes a method for determining the duty cycle $\Delta(Si)$ of an input signal Si, the method comprising the steps of varying the duty cycle $\Delta 2$ of the tuneable matched filter 62 in order to find a specific value $\Delta x$ where the inclined line portion 78 meets the horizontal line portion 77: the duty cycle $\Delta(Si)$ of the input signal Si will be equal to $\Delta x$. In a specific embodiment, the method may comprise the step of increasing the duty cycle $\Delta 2$ of the tuneable matched filter 62 starting at zero, or decreasing the duty cycle $\Delta 2$ of the tuneable matched filter 62 starting at 50%.

In the above, a time cell only contains one bit of information. The present invention further aims to provide an improvement, where the number of bits per cell can be larger than one, and where the duty cycle of the signal can still be varied.

Figure 6A:
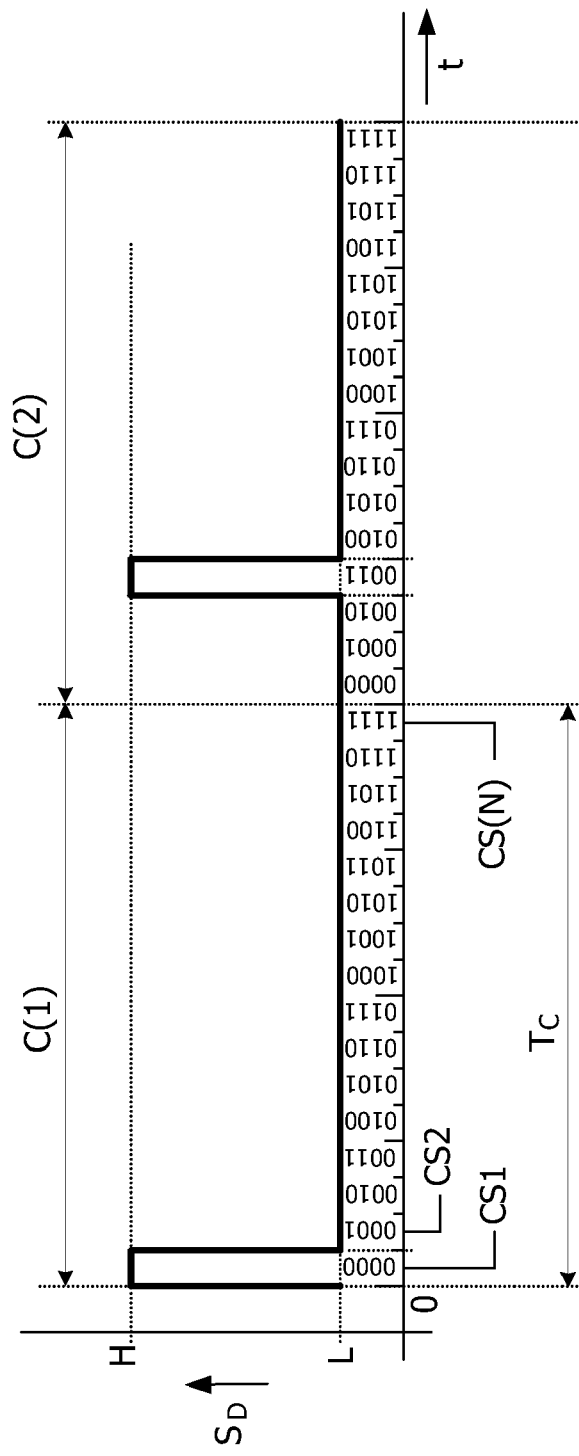
FIG. 6A is a schematic timing diagram illustrating an embodiment of a drive signal according to the present invention.

FIG. 6A is a graph, comparable to FIG. 2C, of a drive signal $S_D$ proposed by the present invention. Again, the signal is divided into time cells, indicated as C(1), C(2), etc. The cells have mutually equal duration $T_C$, which can be determined by a clock signal (not shown for sake of simplicity). Each time cell C(i) is subdivided into a plurality N of consecutive cell segments CS1, CS2, CS3, . . . CS(N) of mutually equal duration. As such, this can be considered as a generalisation of the biphase coded signal, where N=2. Again, the signal $S_D$ can have two signal values H and L only. More particularly, in each cell segment the signal $S_D$ is either H or L, wherein the signal values in the different cell segments CS can be set independently from each other.

The cell segments having value H will be indicated as H-segments while the other segments will be indicated as L-segments. In each cell C(i), a duty cycle $\Delta(i)$ is defined as the proportion of the combined duration of the H-segments to the cell duration $T_C$. Thus, the duty cycle $\Delta(i)$ can be written as N(H)/N, wherein N(H) indicates the number of H-segments. Thus, it is possible to vary the duty cycle $\Delta(i)$ in the cells between 0 and 1 in steps of 1/N.

It is noted that, normally, the duty cycle may be substantially constant over a time period larger than the cell duration. Therefore, in the following discussion, it will be assumed that the duty cycle is constant.

FIG. 6A shows an example of a signal having a duty cycle $\Delta=1/N$. In this example, the first cell segment CS1 of cell C(1) is H while the other cell segments are L. In cell C(2), the fourth cell segment CS4 is H while the other cell segments are L.

It should be clear that, as far as the duty cycle is concerned, it is immaterial which of the cell segments is H. On the other hand, the selection of which cell is H contains information: there are N possibilities, so the cell can have a "value" from 1 to N. For sake of simplicity, assume that $N=2^n$. In that case, a cell can encode for n bits. This is illustrated in FIG. 6A, where n is selected to be equal to 4 so that N=16. In the cell segments, the binary codes for the values 0 to 15 are written (i.e. 0000 to 1111). If the first cell segment CS1 is H, this is interpreted as being equivalent to code word 0000. If the fourth cell segment CS4 is H, this is interpreted as being equivalent to code word 0011. And so forth (it being noted that different translations between number of H-segment and code word are possible). Thus, while keeping the duty cycle constant, the number of bits conveyed per time cell has increased by a factor 4 as compared to the prior art, where a time cell conveys only one bit of information.

The above applies not only to $2^n$ cell segments per cell. More generally, if a cell contains N cell segments, there are N possible positions for the single H-segment, which can encode for $^2\log(N)$ bits per cell.

Figure 6B:
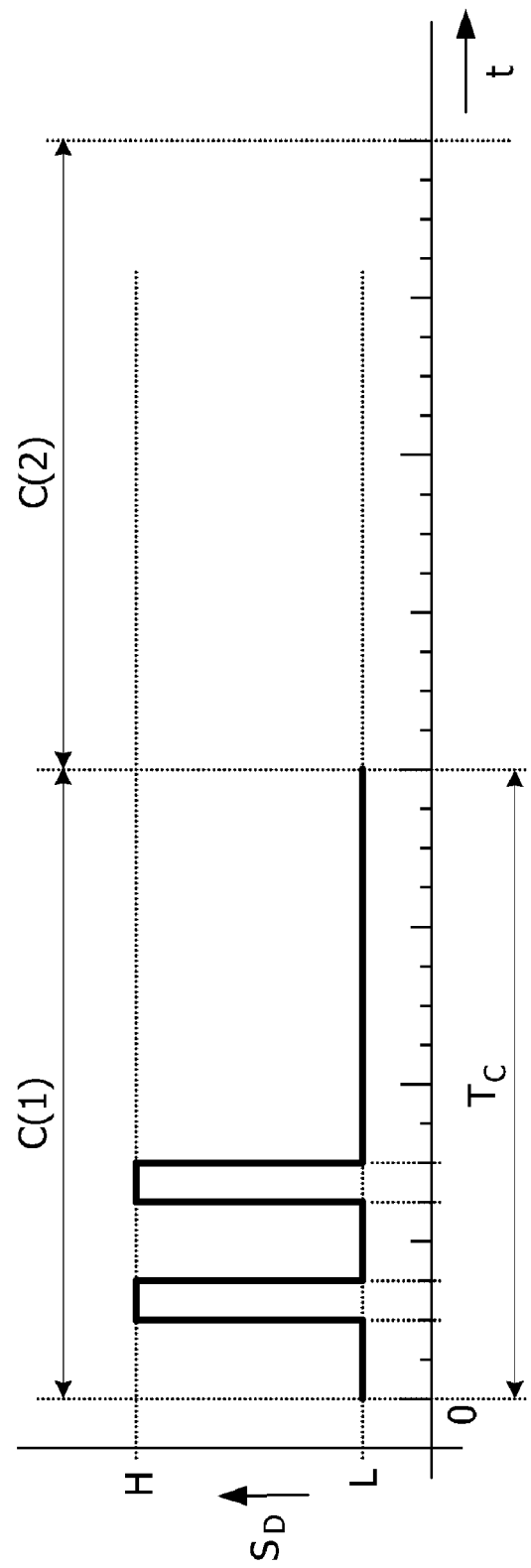
FIG. 6B is a schematic timing diagram illustrating an embodiment of a drive signal according to the present invention.

The above applies to a duty cycle $\Delta=1/N$. FIG. 6B shows an example of a signal having a duty cycle $\Delta=2/N$. In this example, the third and sixth cell segments CS3 and CS6 are H while the other cell segments are L. In case N=16, it should be clear to a person skilled in the art that there are 120 different combinations possible for the locations of two H-segments in a cell, which can encode for $^2\log(\mathbf{120})=6.9$ bits per cell. More generally, if a cell contains N cell segments, there are $$\binom{N}{2}$$

possible combinations for the two H-segments, which can encode for $$^2\log\binom{N}{2}$$

bits per cell.

Even more generally, if the duty cycle $\Delta=m/N$, wherein m is an integer between 1 and N−1, there are $$\binom{N}{m}$$

possible combinations for the two H-segments, which can encode for $$^2\log\binom{N}{m}$$

bits per cell.

From the above explanation, it should be clear that the signal contains data as well as duty cycle information.

From the above explanation, it should further be clear that, for a given data rate determined by the duty cycle, the data content can be selected freely without disturbing the duty cycle. Further, it should be clear that the duty cycle can be varied (in steps of 1/N) and that, for each value of the duty cycle, the number of bits of information per cell has increased with respect to prior art bi-phase coding, it being noted that the extent of the increase depends on the duty cycle.

In general, with the duty cycle being kept constant, the number of bits per cell increases with the number of cell segments per cell. However, with the cell length being kept constant, there is a lower limit as to the duration of the cell segments. If it is desired to still further increase the number of cell segments per cell, the cell length should be increased. However, it is not necessary to increase the number of cell segments per cell ad infinitum, because the effect of such increase decreases.

Figure 7:
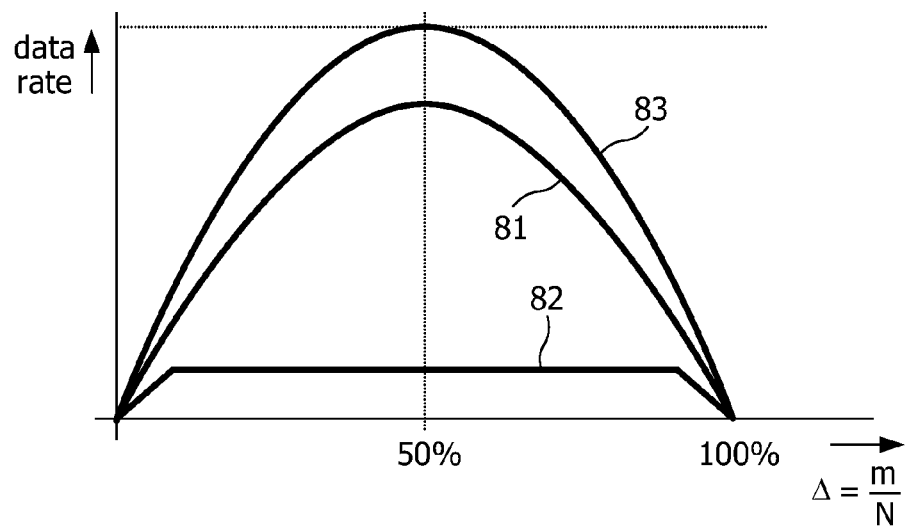
FIG. 7 is a graph showing data rate as a function of duty cycle.

FIG. 7 is a graph showing the data rate, expressed as number of bits per cell segment (vertical axis), as a function of the duty cycle $\Delta=m/N$ (horizontal axis). A first curve 81 relates to the above example of a cell having 16 cell segments, and shows $$\frac{^2\log\binom{16}{m}}{16}$$

as a function of the duty cycle $\Delta=m/16$. A horizontal line 82, by way of comparison, indicates the amount of 1/16, corresponding to one bit per cell for a cell having 16 segments, which indicates the prior art data rate. It can be seen that the improvement of the data rate as compared to the prior art involves a factor 10 if the duty cycle is in the order of 0.5. A third curve 83 shows the maximum data rate that can be achieved, i.e.

$$\frac{^2\log\binom{N}{m}}{N}$$

for the limit of N approaching infinity. Here, reference is made to Shannon's "entropy function" h. It can be seen that by setting the number N of cell segments to 16, 85% of the maximally possible data rate is achieved. If the number N of cell segments would be increased to 100, the data rate would only rise to 96% of the maximally possible data rate. Thus, N=16 is a suitable, adequate and preferred choice, if data rate is the only issue of concern. However, since the duty cycle can only be varied in steps of 1/N, as mentioned, it would be preferable to have N much higher, for instance as high as 1024 or even higher.

FIG. 7 illustrates that the highest data rate is obtained if the duty cycle is close to 50%. However, normally the duty cycle can not be selected freely with a view to optimum data rate, since the duty cycle is determined with a view to obtain a certain illumination effect (dimming of an LED), and can be considered as a given constraint when determining the data rate capacity of an LED. For instance, it can be seen in FIG. 7 that if an LED is operated at a duty cycle of 12.5%, the data rate capacity is only 43% of the maximally possible data rate, which is half the capacity as compared to the situation with 50% duty cycle.

However, in case the system comprises a plurality of LEDs, it is possible to increase the data rate. By way of example, consider an embodiment where a light source comprises 4 LEDs for increased light output. In case the LEDs are operated in parallel at a duty cycle of 12.5%, the data rate capacity is only 43%, as mentioned. However, it is also possible to only use one LED at a duty cycle of 50% while keeping the other LEDs off: in that case, the light output of the system as a whole still corresponds to 12.5% of the maximum, while the data rate capacity has increased to 100%.

Likewise, in case the light source is to be operated at a light output of 87.5%, the data rate capacity is increased if one LED is switched at a duty cycle of 50% while keeping the other LEDs continuously on.

Thus, in general, in case a light source comprising X LEDs is to be operated at a light output of Y %, the present invention proposes to operate only part of those LEDs while keeping the other LEDs on or off (depending on Y being higher or lower than 50%). The number of operated LEDs is chosen such that the duty cycle is as close to 50% as possible.

It is noted that it is not necessary that the other LEDs are all on or off: it is possible that some of the other LEDs are continuously ON while the remaining other LEDs are continuously OFF. For instance, if one LED is switched at a duty cycle of 50%, one LED is continuously ON, and the remaining two LEDs are continuously OFF, the average light output is equal to 37.5%.

It is noted that more flexibility can be achieved if the number of operated LEDs differs from one time cell to the next, as long as no visible flicker is incurred. For instance, if in one time cell only one LED is operated at a duty cycle of 50% and the other three LEDs are OFF, the overall light output average considered over those four LEDs is equal to 12.5% of the maximum light output (which maximum would be achieved if all four LEDS would be continuously ON). If in the next time cell two LEDs are operated at a duty cycle of 50% and the other three LEDs are OFF, the overall light output average considered over those four LEDs is equal to 25%. Considered over those two time cells, the overall light output average would be equal to 18.75%. If this second LED is used only once every three time cells, the overall light output average considered over those three time cells and considered over those four LEDs is equal to 16.6%. So, it is possible to combine a duty cycle of 50% in order to achieve maximum data rate with an average overall light output differing from 50%. It is further possible that the duty cycle of the active LEDs is set to be close to 50 but not equal to 50, to be able to approach the intended light output level more closely. Notably, however, this approach introduces low-frequency content and hence increases the chances on visible flicker.

A further increase in data rate is possible if it is not necessary that the LEDs are operated in parallel: as can be easily seen from FIG. 7, the combined data rate of four LEDs operated independently from each other at 12.5% duty cycle each is larger than the data rate of one LED operated at 50% duty cycle.

Figure 8:
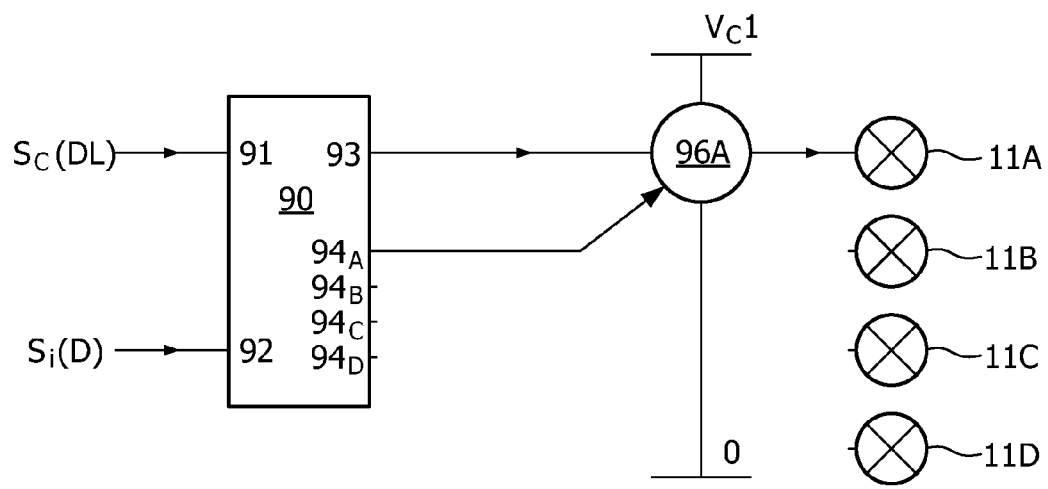
FIG. 8 is a block diagram illustrating a LED driver according to the present invention.

FIG. 8 is a block diagram illustrating a source driver 90 according to the present invention, allowing for the above method of operation, for driving a source comprising 4 LEDs 11A, 11B, 11C, 11D. The driver 90 has a first input 91 for receiving a dim level command signal Sc(DL) and a second input 92 for receiving a data input signal Si(D). Those two inputs may be physically distinct, but they may also be implemented as one combined input. In one mode of operation, the driver 90 determines a number m of active cell segments on the basis of the dim level command signal Sc(DL) according to m=DL·N, wherein DL indicates the dim level. If needed, m may be rounded. With this number m of active segments, i.e. segments having value H, the driver 90 then may drive all LEDs in parallel, performing m-out-of-N encoding; this requires only one output.

For a more efficient data rate, the driver comprises four controllable threeway switches 96A, 96B, 96C, 96D, each associated with a respective LED 11A, 11B, 11C, 11D. For sake of clarity, only one switch 96A is shown, associated with the first LED 11A. The driver 90 has one data output 93, and four switch control outputs 94A, 94B, 94C, 94D, each coupled to a control terminal of a corresponding switches 96A, 96B, 96C, 96D. Each switch has a first input coupled to a constant voltage source Vcl, a second input coupled to a zero voltage, and a third input coupled to the data output 93. Further, each switch has an output coupled to the corresponding LED 11A, 11B, 11C, 11D. Controlled by a switch control signal from the respective switch control outputs 94A, 94B, 94C, 94D, a threeway switch 96A, 96B, 96C, 96D is either in a first operative condition where its output is continuously coupled to its first input so that the corresponding LED 11A, 11B, 11C, 11D is continuously ON, or in a second operative condition where its output is continuously coupled to its second input so that the corresponding LED 11A, 11B, 11C, 11D is continuously OFF, or in a third operative condition where its output is continuously coupled to its third input so that the corresponding LED 11A, 11B, 11C, 11D is operated in duty cycle switching mode. Based on the dim level command signal, the driver calculates suitable values for m, for a number m1 of LEDs that will be continuously ON, and for a number m2 of LEDs that will be continuously OFF. The driver then generates its switch control signals for the switches 96A, 96B, 96C, 96D, so that m3 switches are in their third operative condition, m1 switches are in their first operative condition, and m2 switches are in their second operative condition, wherein $m3=N_{LS}-m1-m2$, $N_{LS}$ indicating the total number of light sources.

It is noted that the switches 96A, 96B, 96C, 96D may be internal or external to the driver 90.

It is further noted that the above explanation relates to the number of LEDs that are ON, OFF, or switched, not necessarily to the identity of the LEDs. For instance, it is possible that a specific LED is continuously ON during a first time cell and continuously OFF during a second time cell while a second specific LED is continuously OFF during the first time cell and continuously ON during the second time cell: although this changes the identity of the ON LEDs and the OFF LEDs, it does not change the number of ON LEDs or the number of OFF LEDs.

Figure 9:
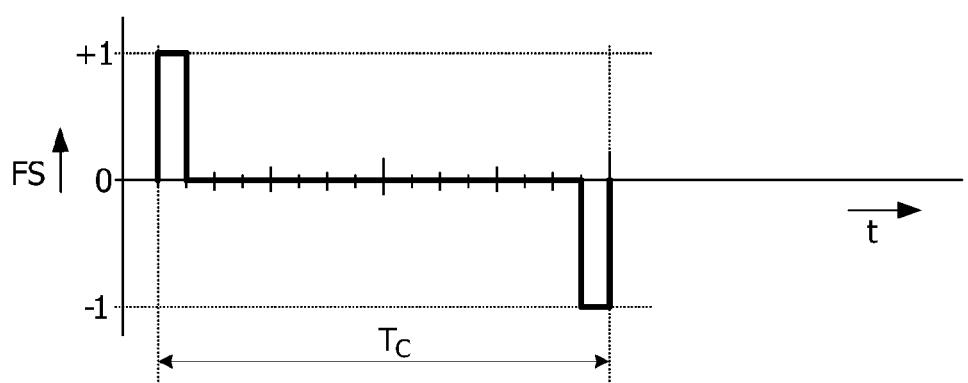
FIG. 9 is a schematic timing diagram illustrating an exemplary preprogrammed waveform (filter shape) of a matched filter.

The above explanation relates to the use of N segments in a time cell, and to control the duty cycle by setting m out of the N segments to be equal to H while the others are L; this will be indicated as m-out-of-N operation. In a further improvement, the present invention proposes to combine the m-out-of-N operation with the bi-phase concept. Again, a time cell is subdivided into N cell segments, N being an even number. Each segment is paired with another segment, such that there are N/2 pairs; here, the phrase "pair" is used to means two segments associated with each other. Each segment can be H or L. In the original bi-phase concept as described above, where N=2, the paired segments always have opposite value, so that the pair can only be either HL or LH. This characteristic can be used in an implementation where the duty cycle is fixed to be 50%. In order to allow the duty cycle to be varied, the present invention further proposes that each segment of a pair can be individually set to H or L, independently from the value of the other segment, so that each pair can be LL, LH, HL, or HH. The value of the pair can be measured using a matched filter which is +1 for the first segment and −1 for the second segment of the pair, and which is 0 for all other segments. By way of example, FIG. 9 illustrates a filter shape for a matched filter which is +1 during the first segment and −1 during the last segment, and 0 for the segments 2-15, in a time cell divided into 16 segments; this matched filter would be suitable for decoding the pair of segments 1 and 16, as will be clear to a person skilled in the art.

The coding in such pair of segments may be as follows:

LL and HH encode "0" (the filter output will be 0);

LH and HL encode "1" (the absolute value of the filter output will be above a threshold).

By way of example, N is taken to be equal to 16, so the number of pairs is equal to 8. Assume that the duty cycle is equal to 1/N (1/16 in this case). This means that only one of the pairs should encode a "1" while all other pairs should be LL coding for "0", so that exactly one segment is H. There are 8 possibilities to do so (i.e. there are 8 pairs to chose from), which can be represented by a code word of 3 bits of information. The choice of the pair being LH or HL offers a 4th bit of information.

If the duty cycle is equal to 2/N (2/16 in this case), there are two ways of achieving this: one way is to have two pairs encoding for a "1" while all other pairs are LL coding for "0", the other way is to have one pair being HH coding for "0" while all other pairs are LL coding for "0". The two pairs coding for "1" can be selected in $$\binom{N/2}{2} = 28$$

possible ways; each pair can be LH or HL, thus multiplying the number of possibilities by 4. The one pair being HH can be selected in 8 possible ways. Thus, the overall number of possibilities is equal to 4*28+8=120, which can be represented by a code word of 6.9 bits of information.

More generally, if the duty cycle is equal to m/N (m/16 in this case), m-out-of-N/2 of the pairs should encode a "1", and there are $$\binom{N/2}{m}$$

possibilities to do so, plus there are m bits of information in the pairs themselves.

Similar calculations can be performed for other values of m. It should be clear that the calculation for m is equal to the calculation for N−m.

Expressing the data rate capacity as the number of bits of information that can be conveyed per cell segment, the conventional biphase method yields 0.5 bits per segment (bps). The method proposed by the invention for m=1 or m=15 yields 4/16=0.25 bps; for m=2 or m=14: 6.9/16=0.43 bps. It can be shown that for all values of m from 3 to 13 the data rate capacity is equal to or larger than 0.5 bps.

Figure 10A:
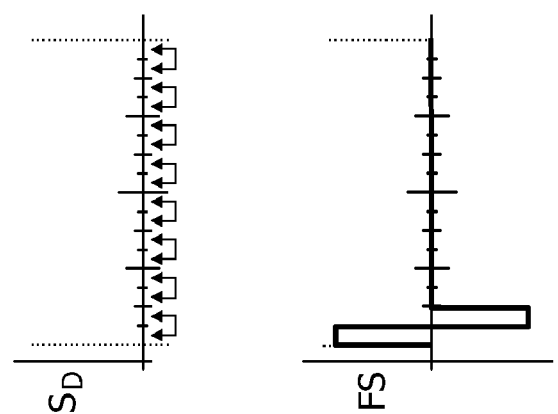
FIGS. 10A-C schematically illustrate different methods for pairing cell segments.

It is noted that there are several methods possible for pairing cell segments. FIG. 10A illustrates a time cell with 16 cell segments, where 8 U-shaped arrows indicate segment pairs. In the example of FIG. 10A, a cell segment is always paired with its neighbour, in a configuration that may be termed "neighbouring pairs". FIG. 10A also shows the filter shape of a matched filter suitable for analysing the first segment pair: this filter shape is +1 during the first cell segment, −1 during the second segment, and 0 for all other segments.

Figure 10B:
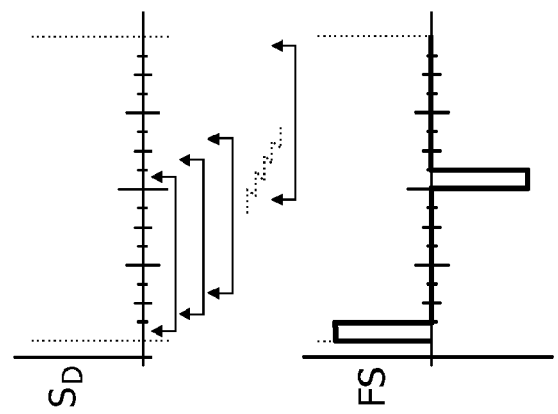

FIG. 10B illustrates a different way of pairing: here, a cell segment i is always paired with cell segment i+8, for i=1 to 8, in a configuration that may be termed "interleaved pairs". FIG. 10B also shows the filter shape of a matched filter suitable for analysing the first segment pair: this filter shape is +1 during the first cell segment, −1 during the ninth segment, and 0 for all other segments.

Figure 10C:
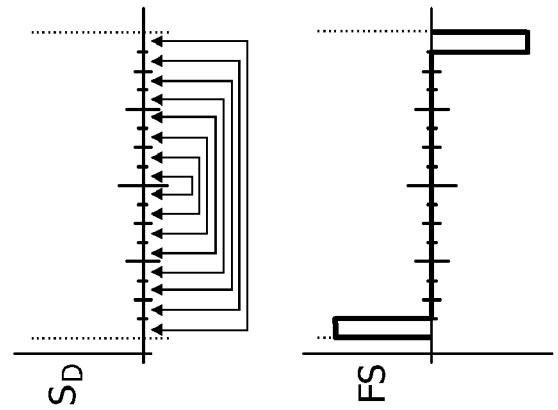

FIG. 10C illustrates yet a different way of pairing: here, a cell segment i is always paired with cell segment 17-i, for i=1 to 8, in a configuration that may be termed "nested pairs". FIG. 10B also shows the filter shape of a matched filter suitable for analysing the first segment pair: this filter shape is +1 during the first cell segment, −1 during the sixteenth segment, and 0 for all other segments.

It is noted that, as far as the coding and the duty cycle are concerned, it makes no difference which method of pairing is implemented, as long as the matched filters of the receiver/decoder correspond to the encoding method used by the sender. However, the "interleaved pairs" method of FIG. 10B or the "nested pairs" method of FIG. 10C offer the advantage that a receiver is also suitable for receiving and processing signals that are bi-phase coded with 50% duty cycle according to earlier art (backwards compatible). The "neighbouring pairs" method of FIG. 10A has lower low-frequency content as compared to the "interleaved pairs" method of FIG. 10B and the "nested pairs" method of FIG. 10C. The "interleaved pairs" method of FIG. 10B is easier to implement.

Figure 11A:
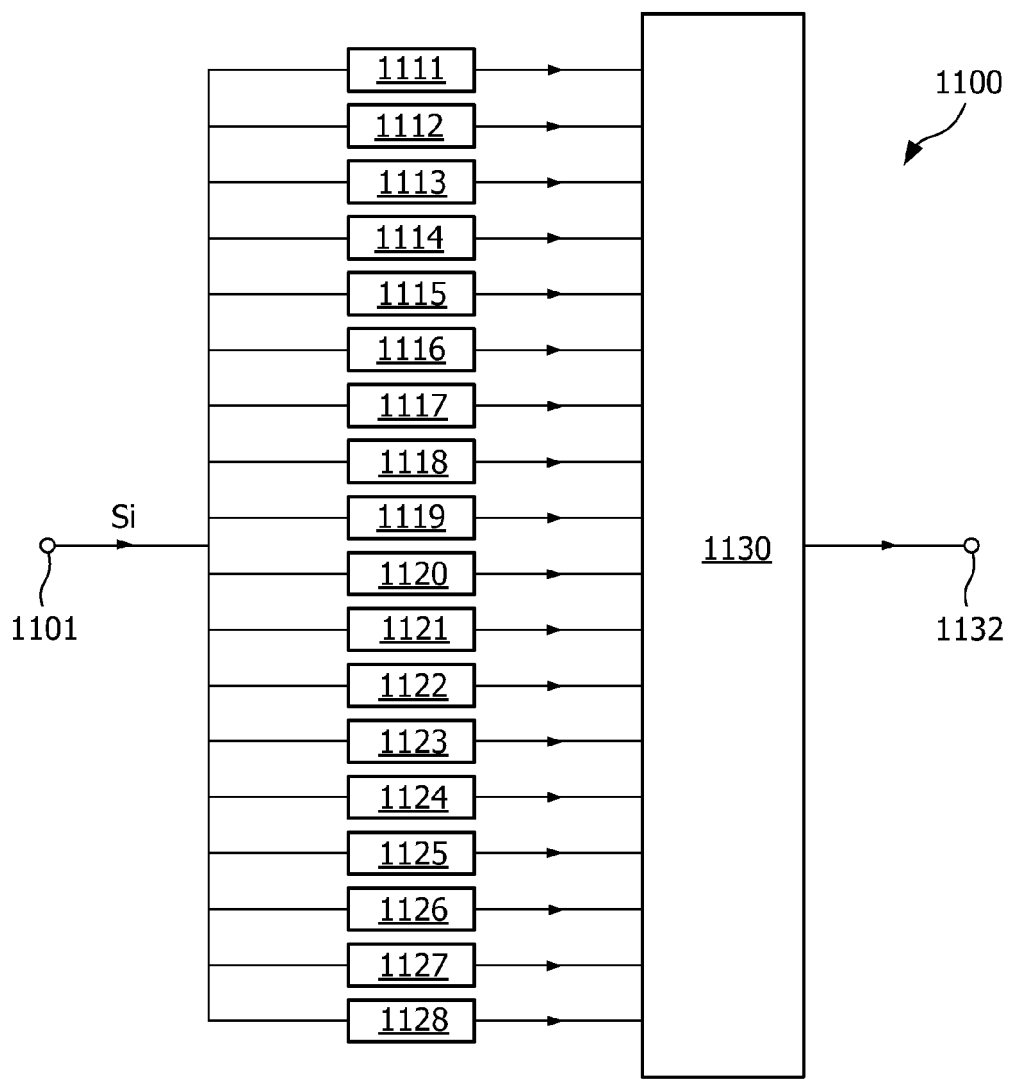
FIG. 11A is a block diagram schematically illustrating an embodiment of a device for receiving and decoding light.

FIG. 11A is a block diagram schematically illustrating a possible embodiment of a device 1100 for receiving and decoding light emitted by an LED in accordance with the above-explained methods of the invention. At a signal input 1101, the signal Si to be analysed is received, i.e. an output signal from a light sensor. The device 1100 comprises a first series of eight matched filters 1111-1118 having their respective input terminals coupled to the signal input 1101. Each matched filter of the first series has a filter shape adapted to a corresponding pair of matched segments for determining whether this corresponding pair of matched segments is HL or LH. FIG. 10C illustrates an example of a filter shape for the case of nested pairs: the filter value for the first cell segment is equal to +1, the filter value for the N-th cell segment is equal to −1, the filter value being 0 for all other cell segments.

Figure 11B:
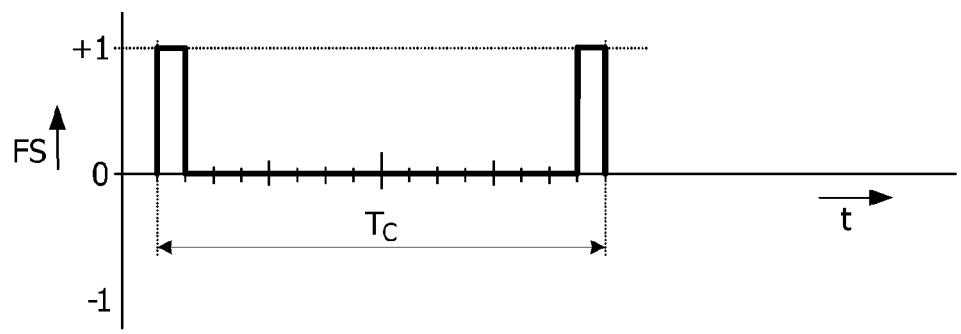
FIG. 11B is a schematic timing diagram illustrating an exemplary preprogrammed waveform (filter shape) of a matched filter.

The device 1100 further comprises a second series of eight matched filters 1121-1128 having their respective input terminals coupled to the signal input 1101. Each matched filter of the second series has a filter shape adapted to a corresponding pair of matched segments for determining whether this corresponding pair of matched segments is LL or HH. FIG. 11B illustrates an example of a filter shape for the case of nested pairs: the filter value for the first cell segment is equal to +1, the filter value for the N-th cell segment is equal to +1, the filter value being 0 for all other cell segments.

The device 1100 further comprises a processor 1130, having inputs coupled to the respective outputs of the filters 1111-1118 and 1121-1128. The processor 1130 is capable to determine, either by calculation or by considering a look-up table, the data content of the time cells, on the basis of the combined information from the individual time segments. The decoded data content can be provided at an output 1132, for further processing.

It is noted that, if required, the processor 1130 is capable to calculate the duty cycle of the received input signal Si.

In the above embodiments, each cell segment contributes to duty cycle as well as contributes to data code. In the following, an embodiment of the present invention will be described, in which data information and duty cycle information is separated (multiplexed) within the cells. This has the advantage that the spectral content for lower frequencies is reduced.

Figure 12A:
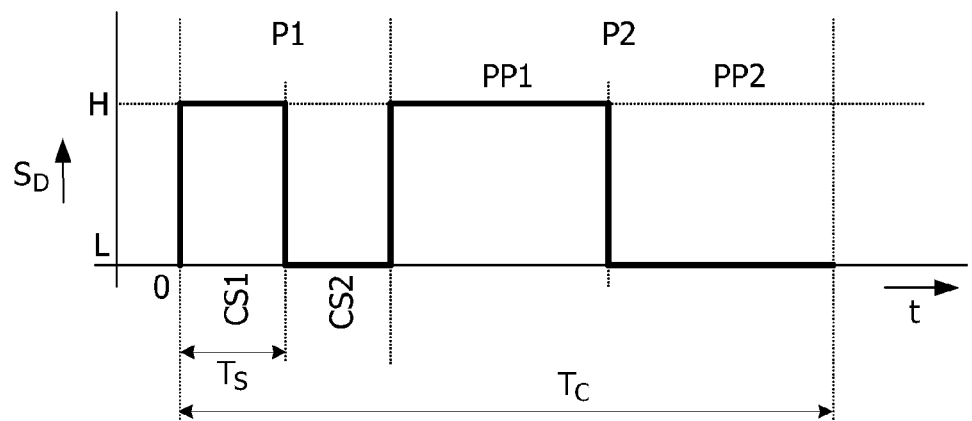
FIG. 12A is a schematic timing diagram illustrating an embodiment of a drive signal according to the present invention.

FIG. 12A is a time diagram, showing the lamp signal (i.e. drive signal $S_D$, or light intensity, or light sensor output signal) as a function of time. The signal is divided into time cells having a duration $T_C$. Each time cell is subdivided into two cell portions P1 and P2, indicated as data portion and duty cycle portion, respectively. The data portion is subdivided into a predefined number of cell segments CS having a duration $T_S$. In FIG. 12A, this predetermined number is equal to 2, the cell segments being indicated as CS1, CS2. The duty cycle portion P2 may be subdivided into cell segments as well, in which case the duration of the cell segments of the duty cycle portion is preferably equal to the duration of the cell segments of the data portion P1.

The two cell segments CS1, CS2 of the data portion P1 can either be L or H, the two cell segments CS1, CS2 always having mutually opposite values, so that the data portion P1 can be represented as either being LH or HL. Thus, the data portion P1 can be considered as being a bi-phase coded bit, either having value "1" (LH) or "0" (HL).

The duty cycle portion P2 is used to control the average intensity of the lighting level of the LED concerned. To this end, the duty cycle portion P2 is subdivided into two parts PP1 and PP2, the first part PP1 being continuously H and the second part PP2 being continuously L. The lengths of the first and second parts PP1 and PP2 can be varied, either continuously or discretely. In case the duty cycle portion P2 is subdivided into cell segments as well, all segments having the same duration, the following relations apply:

$N=T_C/T_S$, N being the number of segments in a cell;

$N_{PP2}=N-2-N_{PP1}$, $N_{PP1}$ and $N_{PP2}$ being the number of H and L segments in the duty cycle portion P2, respectively;

$\Delta=(N_{PP1}+1)/N$, $\Delta$ being the duty cycle.

From the above explanation, it should be clear that the signal contains data as well as duty cycle information. Preferably, N is equal to a large power of 2, for instance 1024, allowing for a 10-bit resolution of the average light level.

From the above explanation, it should further be clear that the data content can be selected freely without disturbing the duty cycle: the number of H-segments is always equal to 1 in the data portion P1. Further, it should be clear that the duty cycle can be varied (in steps of 1/N) from a minimum of 1/N to a maximum of (N−1)/N, without disturbing the data.

Figure 12B:
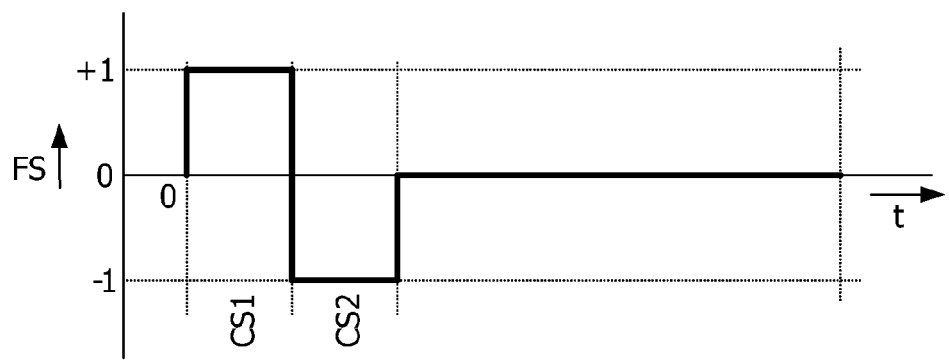
FIG. 12B is a schematic timing diagram illustrating an exemplary preprogrammed waveform (filter shape) of a matched filter suitable for combination with the drive signal of f

FIG. 12B is a diagram illustrating the filter shape of a matched filter suitable for detecting the data content of the signal. This filter shape has a value +1 during the first segment CS1 of the data portion P1, has value −1 during the second segment CS2 of the data portion P1, and has value 0 during the duty cycle portion P2. Output value >0 of this filter represents the decoding of a "0", output value <0 of this filter represents the decoding of a "1".

With the coding scheme of FIG. 12A, the two cell segments CS1, CS2 of the bi-phase coded bit in the data portion P1 are directly adjacent to each other, to the first part PP1 of the same time cell, and to the second part PP2 of the previous cell. A possibility exists that inter symbol interference occurs, i.e. interference between adjacent time cells. In order to mitigate this effect, the present invention proposes a further elaboration illustrated in FIG. 13A, which is a time diagram comparable to FIG. 12A. In this case, the predetermined number of cell segments CS in the data portion is equal to 5. The first, third and fifth cell segments CS1, CS3, CS5 are always L. The second and fourth cell segments CS2, CS4 can either be L or H, the two cell segments CS2, CS4 always having mutually opposite values, so that the data portion P1 can be represented as either being LH or HL. Thus, the data portion P1 can again be considered as being a bi-phase coded bit, either having value "1" (LH) or "0" (HL). Thus, the number of H-bits in the data portion P1 is always equal to 1, and the bit of data can have any value (0, 1) without interfering with the duty cycle setting.

Figure 13A:
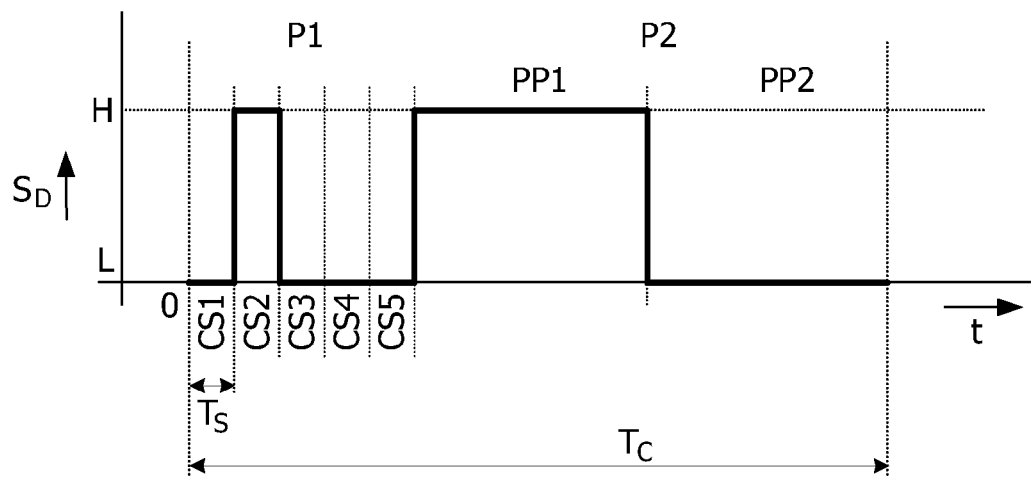
FIG. 13A is a schematic timing diagram illustrating an embodiment of a drive signal according to the present invention.
Figure 13B:
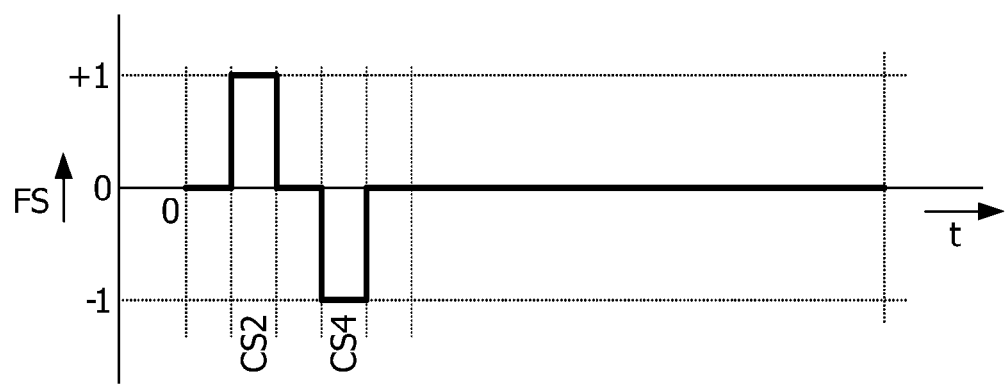
FIG. 13B is a schematic timing diagram illustrating an exemplary preprogrammed waveform (filter shape) of a matched filter suitable for combination with the drive signal of FIG. 13A.

FIG. 13B is a diagram, comparable to FIG. 12B, illustrating the filter shape of a matched filter suitable for detecting the data content of the signal. This filter shape has a value +1 during the second segment CS2 of the data portion P1, has value −1 during the fourth segment CS4 of the data portion P1, and has value 0 during the first, third and fifth segments of the data portion P1 and during the duty cycle portion P2. Output value $\geq 0$ of this filter represents the decoding of a "0", output value <0 of this filter represents the decoding of a "1".

Figure 14A:
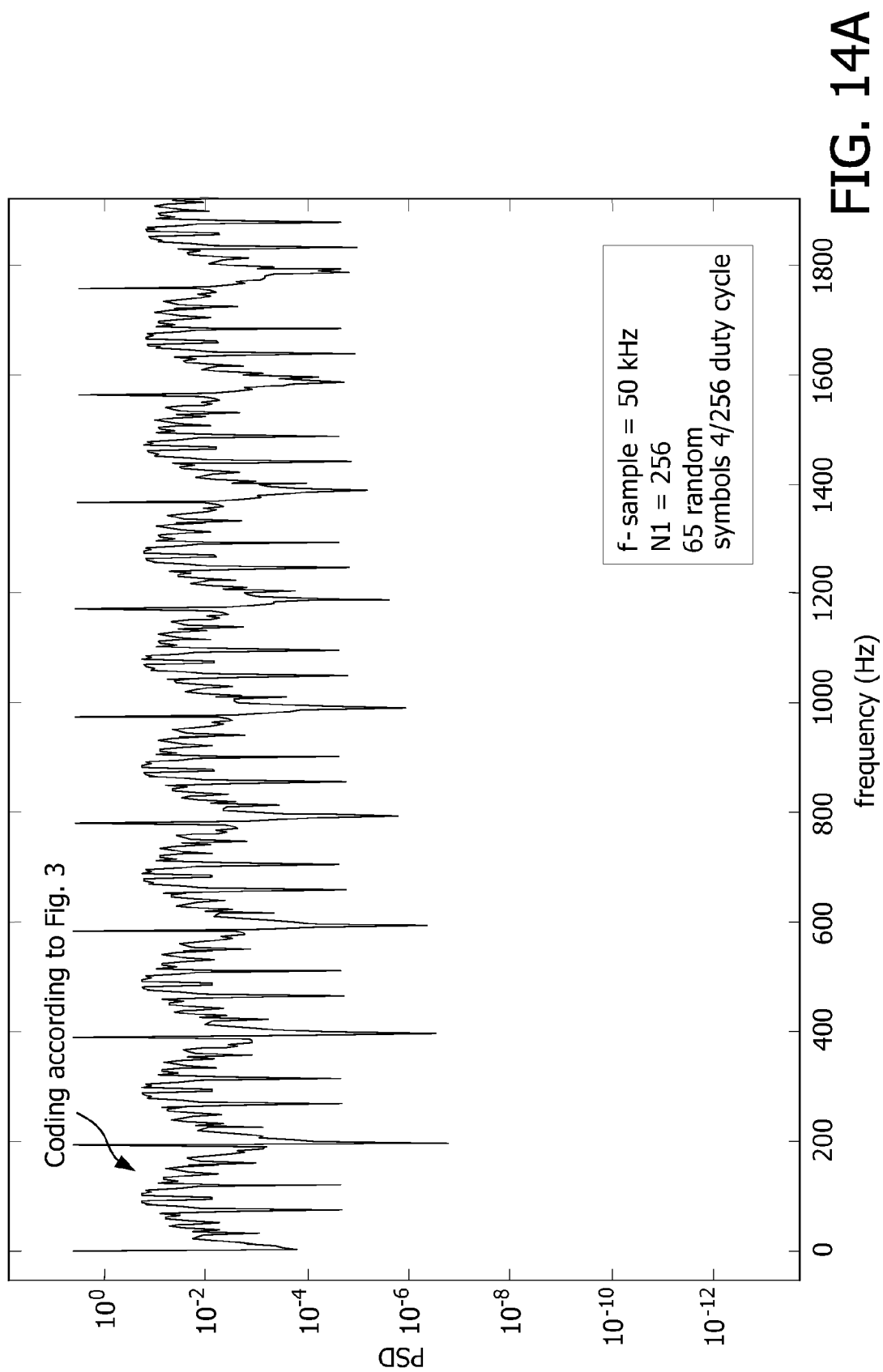
FIGS. 14A-C are graphs illustrating the spectral content of different drive signals.
Figure 14B:
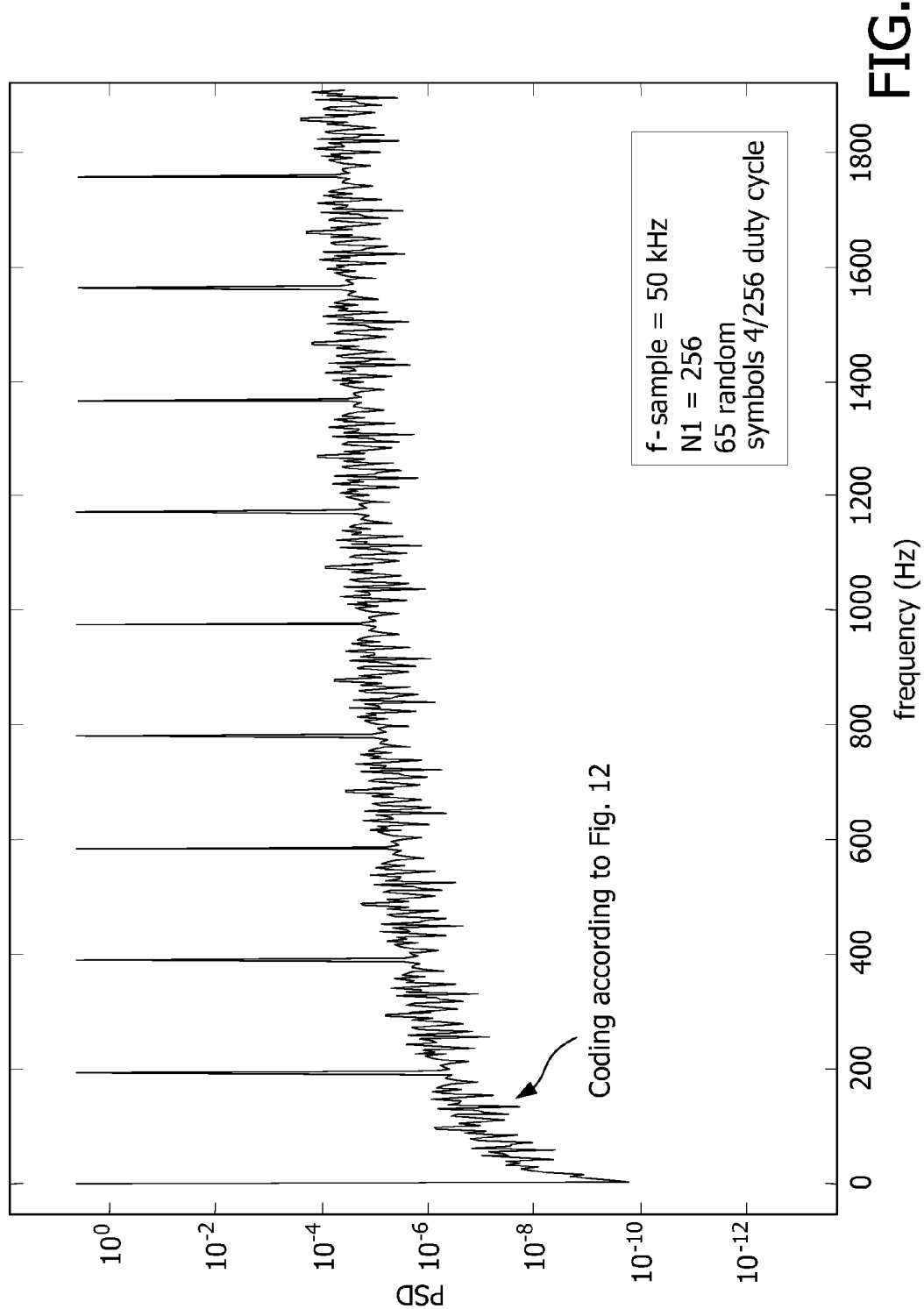
Figure 14C:
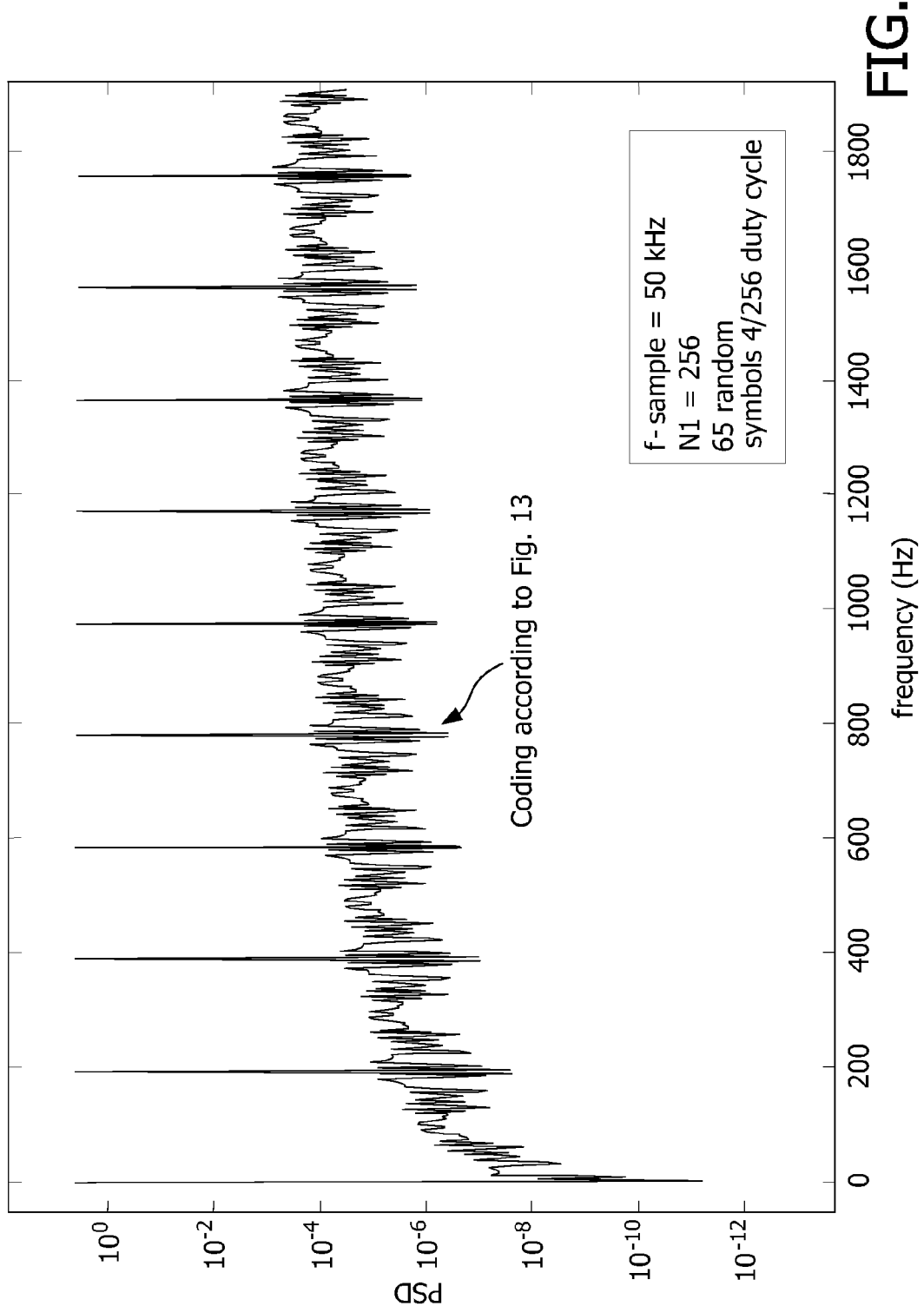

FIGS. 14A-C are graphs illustrating the spectral content of the signal $S_D$ for the coding scheme according to FIG. 3A-B (FIG. 14A), the coding scheme according to FIG. 12A (FIG. 14B), and the coding scheme according to FIG. 13A (FIG. 14C). It can clearly be seen that in the case of the coding scheme according to FIGS. 12A and 13A, the spectral content is lower, especially at lower frequencies, as compared to the case of the coding scheme according to FIG. 3A-B.

Figure 15A:
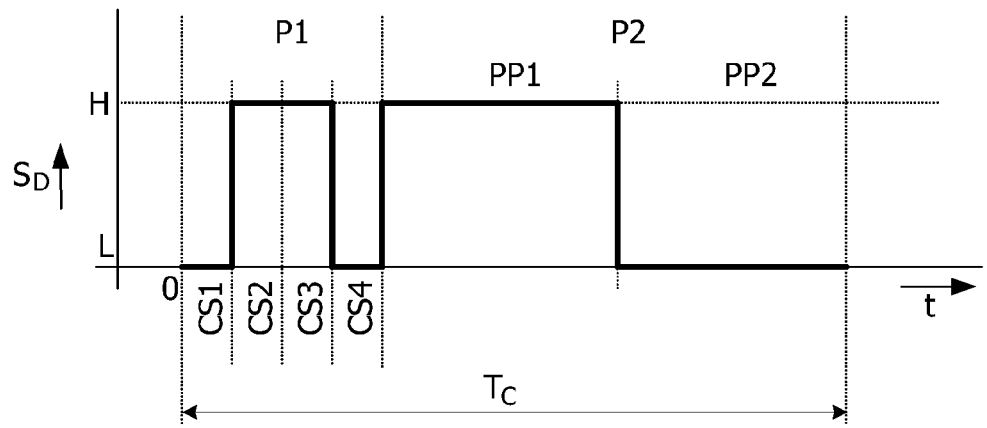
FIG. 15A is a schematic timing diagram illustrating an embodiment of a drive signal according to the present invention.

FIG. 15A is a time diagram comparable to FIG. 12A, illustrating a further elaboration that provides increased data rate and reduced number of transitions per bit. In this case, the predetermined number of cell segments CS in the data portion is equal to 4. The first and third cell segments CS1, CS3 are paired to define a bi-phase coded bit, either having value "1" (LH) or "0" (HL). Likewise, the second and fourth cell segments CS2, CS4 are paired to define a bi-phase coded bit, either having value "1" (LH) or "0" (HL). Thus, the number of H-bits in the data portion P1 is always equal to 2, and the two bits of data can have any value (00, 01, 10, 11) without interfering with the duty cycle setting. FIG. 15A illustrates value "10".

An assembly of four cell segments as described above will be indicated as a quad-phase coded dibit (i.e. two bits).

Figure 15B:
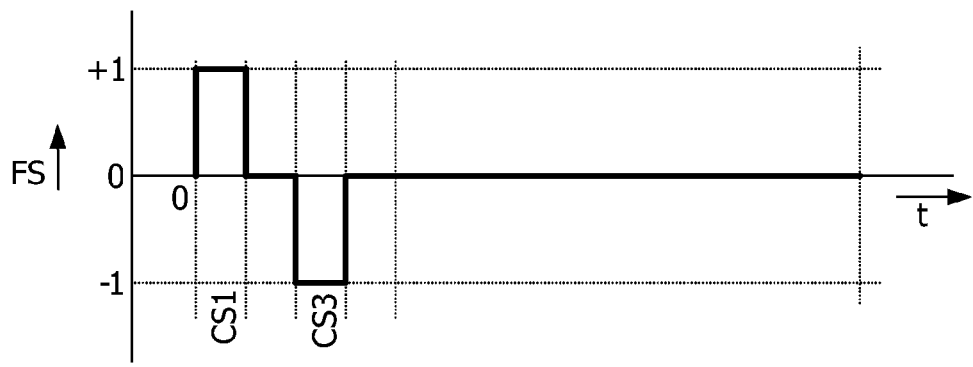
FIG. 15B is a schematic timing diagram illustrating an exemplary preprogrammed waveform (filter shape) of a matched filter suitable for combination with the drive signal of FIG. 15A.
Figure 15C:
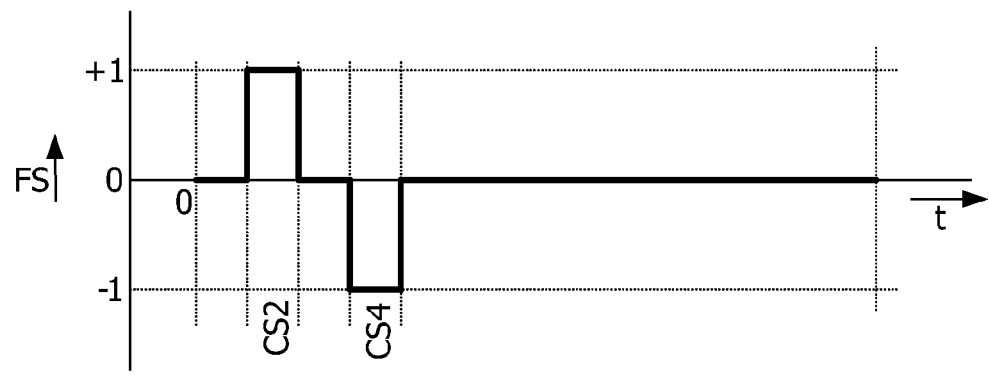
FIG. 15C is a schematic timing diagram illustrating an exemplary preprogrammed waveform (filter shape) of a matched filter suitable for combination with the drive signal of FIG. 15A.

FIGS. 15B-C are diagrams, comparable to FIG. 12B, illustrating the filter shapes of two matched filters suitable for individually detecting one of the bits of the data content of the signal. In FIG. 15B, this filter shape has a value +1 during the first segment CS1 of the data portion P1, has value −1 during the third segment CS3 of the data portion P1, and has value 0 during the second and fourth segments of the data portion P1 and during the duty cycle portion P2. Output value $\geq 0$ of this filter represents the decoding of a "0", output value <0 of this filter represents the decoding of a "1", both in respect of the first data bit. Similarly, in FIG. 15C, this filter shape has a value +1 during the second segment CS2 of the data portion P1, has value −1 during the fourth segment CS4 of the data portion P1, and has value 0 during the first and third segments of the data portion P1 and during the duty cycle portion P2.

As compared to the embodiment of FIG. 13A, the embodiment of FIG. 15A requires only four segments in the data portion P1, so that the duty cycle portion P2 can have one cell segment more, while still there is always one cell segment interval between the two cell segments of one data pair, while yet the number of bits per time cell has doubled.

Figure 15D:
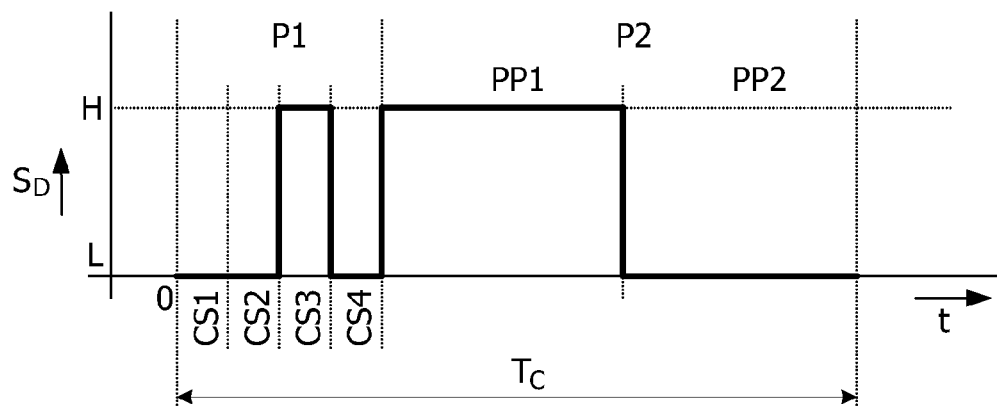
FIG. 15D is a schematic timing diagram illustrating an embodiment of a drive signal according to the present invention.

When all segments of the duty cycle portion P2 are L, the lowest lighting level is achieved. In the case of a signal according to FIG. 15A, this lowest lighting level corresponds to level 2/N, i.e. always two data segments are H. It is possible to further reduce the lowest lighting level by 50% by switching off one of the paired segments, which is illustrated in FIG. 15D. In this example, the first and third cell segments CS1, CS3 are still operative to define a bi-phase coded bit, while the second and fourth cell segments CS2, CS4 are always L. Now, the number of H-bits in the data portion P1 is always equal to 1.

With this one pair of cell segments, i.e. the first and third cell segments CS1, CS3, only one bit of data can be bi-phase coded. Similarly, it is possible to code only one bit of data with the other pair of cell segments, i.e. the second and fourth cell segments CS2, CS4. However, it is possible to code a second bit by the selection as to which pair is active and which pair is low.

In the above examples, the duty cycle portion P2 contains many H and L segments, the respective numbers depending on the required average lighting level: if the required average lighting level increases, the number of H-segments increases and the number of L-segments decreases, and vice versa. According to a further elaboration of the invention, it is possible to increase the data rate capability by increasing the size of the data portion P1 and decreasing the size of the duty cycle portion P2. Assume that the required average lighting level corresponds to a duty cycle q/N, wherein q is a multiple of 2, and $q \leq N/2$. This means that q segments should be H and N−q segments should be L. This can be effected by defining q/2 groups of 4 consecutive cell segments, each such group being a quad-phase coded dibit as explained with reference to FIG. 15A, i.e. always containing two H-segments and two L-segments, and capable of containing two bits of information each. In such case, the data portion P1 would contain 2q cell segments and the duty cycle portion P2 would contain N−2q cell segments, all being L. If the required average lighting level would increase such as to correspond to an increase in duty cycle by 1/N, one cell segment of the duty cycle portion P2 would be H.

If q>N/2, it is possible to have q' dibits, with q'=N/2−q. In such case, the data portion P1 would contain 2q' cell segments and the duty cycle portion P2 would contain N−2q' cell segments, all being H.

It should be clear that, in all such cases, it would be possible to encode any data without interfering with the duty cycle. Conversely, if the duty cycle would change, only the number of dibits and hence the data rate would change. It would seem that a receiver would need to know the actual duty cycle in order to be able to correctly decode the data, but this is not necessary.

Figure 16A:
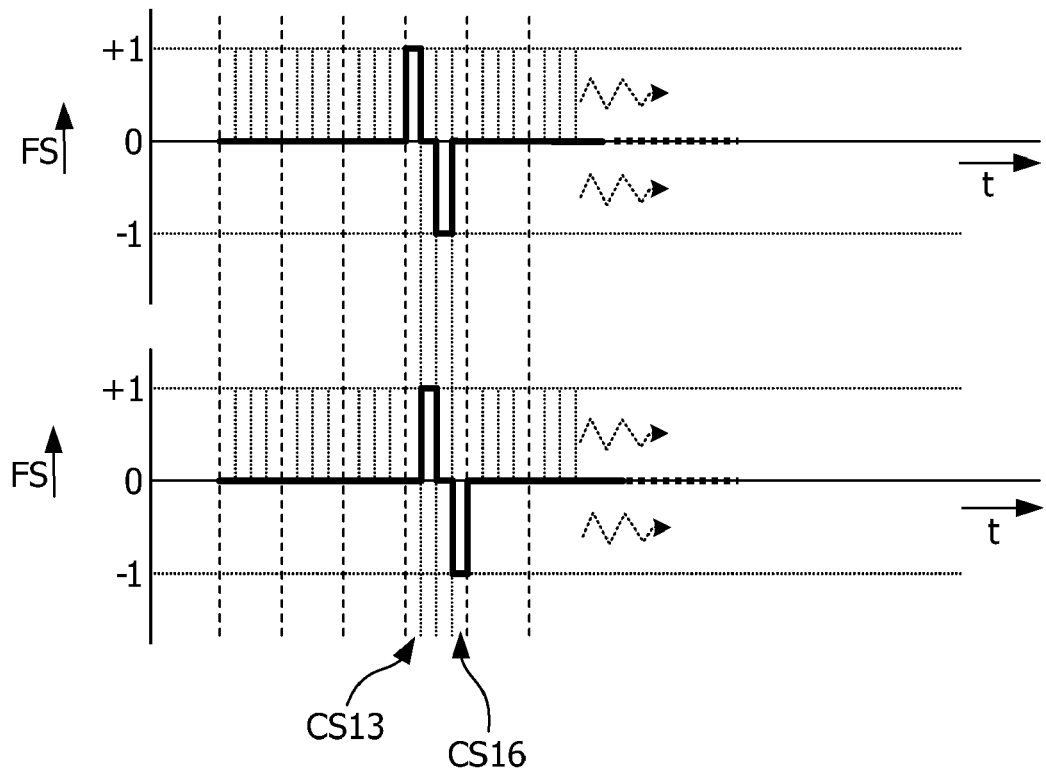
FIG. 16A is a schematic timing diagram illustrating exemplary preprogrammed waveforms (filter shapes) of matched filters.

It is noted that in the case of FIG. 15A, a receiver would be designed to expect only one dibit in the first four cell segments, and a corresponding decoder would only have two matched filters with the filter shapes of FIGS. 15B and 15C, respectively. In contrast, in the present elaboration, a receiver would be designed to expect a maximum of N/4 dibits, assuming that N is a multiple of 4, and a corresponding decoder would have N/4 sets of two matched filters with filter shapes comparable to the filter shapes of FIGS. 15B and 15C, but now for neighbouring dibits. By way of example, FIG. 16A shows the filter shapes of the two matched filters for use with the fourth dibit, i.e. cell segments 13-16.

Figure 16B:
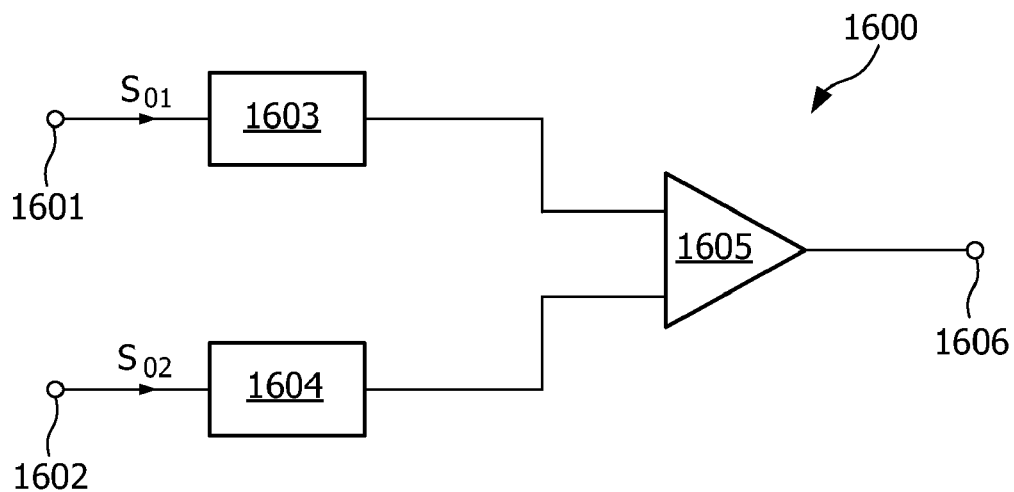
FIG. 16B is a schematical block diagram of a determining circuit.

FIG. 16B is a schematical block diagram of a circuit 1600 for determining whether a group of four consecutive cell segments is used as a dibit of valid data or not. As should be clear, a decoder would have N/4 of such circuits, each associated with a corresponding group of four consecutive cell segments. The determining circuit 1600 has a first input 1601, for receiving the output signal So1 of a first matched filter associated with this corresponding group of four consecutive cell segments (for instance the filter having the filter shape of the upper graph in FIG. 16A), and a second input 1602, for receiving the output signal So2 of a second matched filter associated with this corresponding group of four consecutive cell segments (for instance the filter having the filter shape of the lower graph in FIG. 16A). The first circuit input 1601 is coupled to a first absolute value calculator 1603, and the second circuit input 1602 is coupled to a second absolute value calculator 1604. An AND-gate 1605 has inputs coupled to the outputs of the two absolute value calculators 1603, 1604, and its output is coupled to a circuit output 1606.

If the group of four consecutive cell segments is part of the data portion P1 (i.e. used as a dibit), each filter output signal will either be +1 or −1, corresponding to bit value "0" or "1", so the output of each absolute value calculator will be "1"; in that case, the signal at the circuit output 1606 will be "1". If the group of four consecutive cell segments is part of the duty cycle portion, at least one filter output signal will be 0, so the output of the corresponding absolute value calculator will be 0 and the signal at the circuit output 1606 will be "0". In such case, the decoder may decide that this group of four consecutive cell segments as well as all subsequent cell segments are part of the duty cycle portion and do not contain data.

It can be shown that, for large q, the number of HL-transitions per bit approaches unity.

In the above, aspects of the present invention have been described in relation to the driving of individual LEDs, or groups of LEDs driven in parallel. Specifically, it has been shown how data can be transmitted and duty cycle can be varied in the same digital signal. Further, it has been shown how data rate can be increased. Now, a further aspect of the present invention relates to the fact that a system may comprise multiple LEDs driven with different signals.

For instance, in an illumination system where the data to be transmitted is only intended to identify the respective LEDs (or respective LED groups), different LEDs will obviously emit different identification data. Further, in a system where the data to be transmitted contains audio and/or video, different audio/video may be transmitted at different locations. In all of such situations, it may happen that a receiver receives light signals from different LEDs, and the different signals may interfere with each other. For instance, reference is made to FIG. 15A, which illustrates the light intensity as function of time of an LED transmitting data "10". If a neighbouring LED would at the same time be transmitting data "01", the first four cell segments would be "HLLH". A receiver receiving both light signals would then receive a sum-signal, i.e. "HHHH": the receiver has no means to distinguish which light originates from which LED.

The present invention also aims to provide a solution for this complication.

Figure 17:
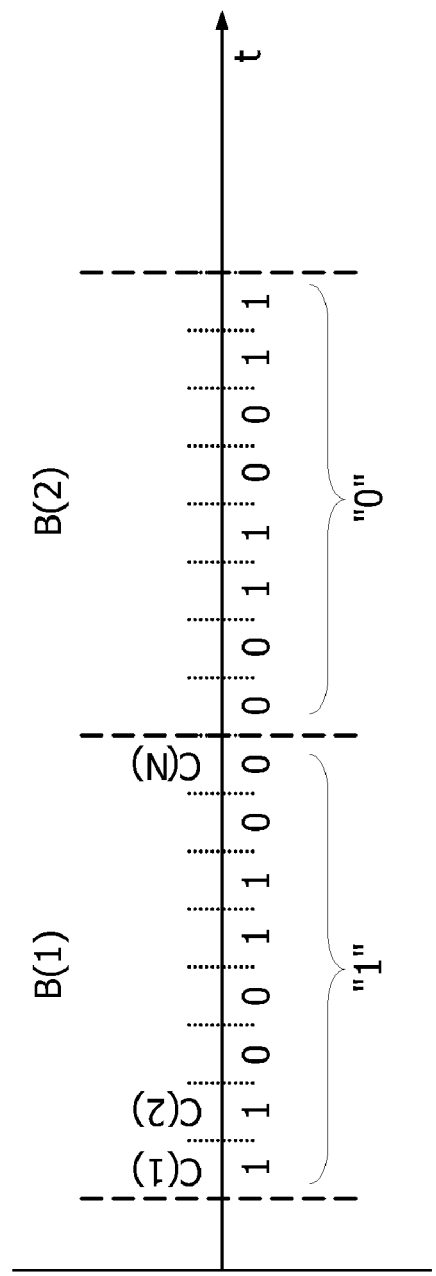
FIG. 17 is a schematic timing diagram illustrating time cells grouped to define a time block.

FIG. 17 schematically shows a time line (horizontal axis), which is divided into successive time blocks B(1), B(2), etc. Each time block in turn is subdivided into a succession of time cells C(1), C(2), etc. Reference is made to FIG. 1 again. The number of time cells is indicated as block length BL, and is equal for all time blocks. In FIG. 17, two time blocks are shown, each having 8 time cells, so BL=8.

Each LED 11, 12, 13 is controlled individually with a combination of duty cycle switching and coded switching according to any of the above-explained methods. This means that, for each cell and for each LED, the above explanation applies. The switching of each LED is independent from the switching of all other LEDs, with the proviso that the time base is the same for all LEDs (synchronisation). For the following discussion, it is assumed that a coding scheme is used wherein an LED transmits only one bit during each time cell; however, it should be clear to a person skilled in the art that the following explanation also applies to schemes where LEDs transmit multiple bits per time cell, in which case the explanation relates to each individual bit in such time cell. It is particularly noted that for the following explanation it is irrelevant which of the above coding schemes is used. It is further assumed that a receiver 40 or a controller 30 are capable of deriving a signal representing the data content of the individual time cells without being disturbed by the duty cycle content of the time cells.

In each time cell, a receiver 40 receives contributions from all LEDs within its reach, those contributions not necessarily having mutually equal signal strengths. In general, it is impossible for a receiver to determine, within one time cell, which LED is the origin of which portion of the light as received.

Each bit transmitted by an LED during one time cell will be indicated by the phrase "code bit". According to the invention, the code bits of the successive time cells in one time block together form a block word. The length of the block word therefore is equal to BL bits. Further, each LED is associated with a binary code word W of length BL in a unique manner, meaning that all different LEDs have mutually different code words. Thus, a specific code word W is capable of identifying a specific LED. More particularly, the binary code words of the different LEDs are orthogonal to each other, which means that, for each code word, it holds that the inner product between that code word and each of the other code words is equal to zero, if the "0"s are replaced by "−1"s. Thus, for a system comprising BL different LEDs, code words of at least length BL are needed, which can suitably be derived for instance from the rows of a Hadamard matrix of order BL by replacing the matrix elements of value −1 by a value 0.

Further according to the invention, each source driver 21 is designed for driving the corresponding LEDs such that in each time block B the code bits of an LED either form the associated code word W of that LED or form the mod2 inverted word $\overline{W}$, where each bit "1" has been replaced by a "0" and each "0" has been replaced by a "1". The choice whether an LED emits a sequence of code bits corresponding to its associated code word W or a sequence of code bits corresponding to its mod2 inverted word W constitutes a single user bit having value "1" or "0", respectively. Thus, in each time block, an LED transmits only one user bit. Thus, the data rate of the user bits is lower than the data rate of the code bits by a factor BL.

Assume that an LED has been associated with code word W=11001100. As illustrated in FIG. 17 for time block B(1), this LED transmits successive code bits 1, 1, 0, 0, 1, 1, 0, 0 in the time cells C(1)-C(8) in order to transmit one user bit "1"; and as illustrated in FIG. 17 for time block B(2), this LED transmits successive code bits 0, 0, 1, 1, 0, 0, 1, 1 in order to transmit one user bit "0".

FIG. 18A shows a Hadamard matrix of order 8, and FIG. 18B shows a code word matrix derived from this Hadamard matrix, wherein each "−1" has been replaced by a "0". Assume that a system comprises three LEDs 11, 12, 13, to which the code words of rows 2, 3, 8, respectively, of this matrix have been assigned, as will be indicated by W(11), W(12), W(13). Assume further that these LEDs simultaneously send a "0", a "1", and a "1", respectively, during a certain time block. A receiver would then receive $\overline{W}$(11)+W(12)+W(13) during this time block, i.e. value 11312022. It should be clear to a person skilled in the art that a decoder (be it in the detector 40 or the controller 30) having knowledge of the code word matrix of the system is capable of decoding this value by performing a Hadamard transformation, to find that this value can only originate from the LEDs having code words 2, 3, 8 respectively, code word 2 being inverted, and thus decoding a "0", a "1", and a "1", respectively, for LEDs 11, 12, 13.

To this end, the decoder can comprise a plurality of matched filters, each matched filter corresponding to the Hadamard code of a corresponding LED. The output of such matched filter will correspond to the inner product of the corresponding Hadamard code with the value of the signal block word. If the absolute value of this inner product is higher than a certain threshold, it can be concluded that the corresponding LED has sent a bit, whereas, if the absolute value of this inner product is lower than the threshold, it can be concluded that the corresponding LED has not sent any bit.

For instance, for the second matched filter, the inner product would be:

$$(-1,1,-1,1,-1,1,-1,1)\cdot(1,1,3,1,2,0,2,2)=-4,$$

indicating a bit "0" for the second LED.

Further, for the third matched filter, the inner product would be:

$$(-1,-1,1,1,-1,-1,1,1)\cdot(1,1,3,1,2,0,2,2)=+4,$$

indicating a bit "1" for the third LED.

Further, for the fourth matched filter, the inner product would be:

$$(-1,1,1,-1,-1,1,1,-1)\cdot(1,1,3,1,2,0,2,2)=0,$$

indicating "no transmission" for the fourth LED.

Thus, the problem of potential interference is solved.

It is noted that, by requiring each LED to use code words of length BL to encode each single user bit, the data rate for a LED has reduced by a factor BL. On the other hand, since the number of LEDs can be equal to BL, the data rate of the system as a whole remains the same.

For the case of bi-phase duty cycle coding, the matched filters used may have a large duty cycle of 50%, or may have a low duty cycle of, for instance, 10%. Using a matched filter with a large duty cycle of 50% has the advantage of always giving maximum signal output for each LED, which may be beneficial if some LEDs are remote from the detector and thus have a large attenuation. On the other hand, such filter also accumulates the largest noise power, which is disadvantageous for the LEDs with a low duty cycle.

Using a matched filter with a small duty cycle of 10% has the advantage of equalizing the power differences between the various LEDs as perceived by the detector, and of being optimal for LEDs having very small or very large duty cycle. On the other hand, for LEDs having an intermediate duty cycle, potential signal energy is thrown away.

To avoid the disadvantages, it is possible that the decoder, in respect of each LED, comprises multiple matched filters, for instance having duty cycles of 10%, 20%, 30%, 40%, 50%. The received light signal is processed by all filters in parallel, and the Hadamard transformation is performed on the output of all filters, thus giving a plurality (here: 5) of estimates for the data sent by LED i. It will be clear that the different outputs may have different signal energy. Now, for each LED i, a selection must be made as to which filter to "believe". According to the present invention, the result of the Hadamard transformation of the one filter having the smallest duty cycle but still the maximum signal energy is selected for further processing.

It is further noted that the selection of which matched filter is to be used for LED i can suitably be done in the preamble, where a known signal is transmitted, as will be explained below.

Since the system comprises one common controller 30 for all drivers, synchronisation of the different drivers will be relatively easy to implement. In the following, such synchronisation will be silently assumed. However, in a system where the detector 40 is a separate device, for instance a handheld device, the detector has no knowledge regarding the time base. To solve this problem, the present invention further proposes to communicate synchronisation information to the detector by including such synchronisation information in the signals.

Figure 19:
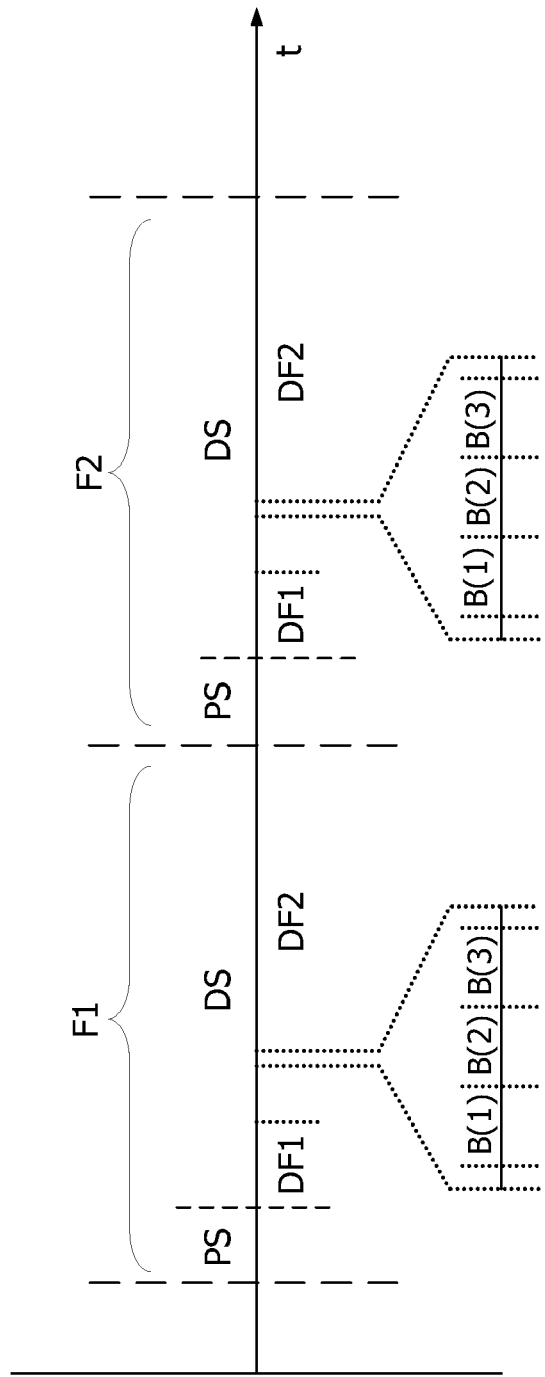
FIG. 19 is a schematic timing diagram illustrating time frames with a preamble and a plurality of time blocks.

In an embodiment, illustrated in FIG. 19, this is solved by organizing the signals into frames. The time base is divided into frames F1, F2, etc. Each time frame is subdivided into a preamble section PS and a data section DS. During the preamble, all LEDs simultaneously transmit the same sequence of "0" and "1" bits, albeit each LED at its own duty cycle. As a result, the detector would not receive interfering signals but concurring signals. The sequence of "0" and "1" bits will be chosen such as to enable the detector to synchronize a clock. The sequence will be predetermined and known to the detector, and the end of the sequence indicates the beginning of the data field. In the preferred embodiment, the preamble contains a clock signal as well as a sync signal.

During the data section, each LED transmits its specific coded information as explained before. Each data section may comprise multiple time blocks, the number of block depending inter alia on the accuracy of the clocks.

In a preferred embodiment, each data section is subdivided into data fields DF, where one of the data fields (preferably the first data field) contains system information, for instance information identifying the Hadamard matrix used, information identifying which LEDs are active and which LEDs are not, information identifying the duty cycles of the respective active LEDs, etc. It is preferred that this system information is transmitted by all LEDs simultaneously, so it is also possible to consider this system information data field as being part of the preamble.

It is possible that there are LEDs which are used for illumination purposes but which are temporarily inactive as regards data transmission. It is preferred that such inactive LEDs continuously transmit a predefined dummy code, for instance continuously the symbol "0". This will have the advantage that the detector 40 will always receive a strong clock signal for synchronisation purposes.

It is noted that the number of (active) LEDs may be less than the capacity of the Hadamard matrix used, i.e. less than the number of rows in the Hadamard matrix (the "order" of the Hadamard matrix. It is further noted that it is preferred that the first row of the Hadamard matrix (which consists only of bits "1") is not used, since a strong background clock is associated with this Hadamard row.

Summarizing, the present invention provides a method for driving a light source 11, 12, 13, wherein the light source is alternately switched ON and OFF in an ON/OFF pattern, wherein the duty cycle of the ON/OFF pattern is varied to vary the average light intensity of the light source, and wherein the shape of the ON/OFF pattern is varied to transmit data. Thus, a control signal for the light source comprises data information as well as duty cycle information. The duty cycle is varied within a range from almost zero to almost 100%, and data varied and transmitted is without affecting the duty cycle. Further, the signal has relatively low spectral energy for frequencies in the region of DC in order to prevent flicker.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, features that have been described in relation to a specific embodiment of the invention only can also be applied in other embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Method for driving a light source, wherein the light source is alternately switched ON and OFF in an ON/OFF pattern, wherein the duty cycle of the ON/OFF pattern is varied to vary the average light intensity of the light source, and wherein the shape of the ON/OFF pattern is varied to transmit data, comprising the steps of:
defining a duty cycle ratio $\Delta$ in the range from 0 to 1, $\Delta$ being unequal to 0.5;
defining a time base divided into time cells having a duration Tc;
wherein each time cell is subdivided into two cell segments;
wherein, in at least one time cell, the first cell segment has a duration $\Delta \cdot$Tc, the second cell segment has a duration $(1-\Delta) \cdot$Tc, and the light source is switched ON in the first cell segment and switched OFF in the second cell segment for coding a bit having a first value; and wherein, in at least one other time cell, the first cell segment has a duration $(1-\Delta) \cdot$Tc, the second cell segment has a duration $\Delta \cdot$Tc, and the light source is switched OFF in the first cell segment and switched ON in the second cell segment for coding a bit having a second value different from the first value.

2. Method according to claim 1, wherein the duty cycle is selected at any value within a range from almost zero to almost 100%, and wherein the shape of the ON/OFF pattern is varied to transmit data without affecting the duty cycle.

3. Method according to claim 1, comprising the steps of:
defining a time base divided into time cells having a duration Tc;
wherein each time cell is subdivided into N cell segments of mutually equal duration, wherein N is a positive integer;
defining a duty cycle ratio $\Delta$=m/N, with m being an integer in the range from 1 to N−1;
in each time cell, on the basis of data to be encoded, selecting a pattern of m of said cell segments, the pattern representing said data; and
switching the light source ON during said m of said cell segments and switching the light source OFF during the remaining N-m of said cell segments.

4. Method according to claim 3, wherein the pattern of m segments is varied to encode different values for $$^2\log\binom{N}{m}$$

bits per time cell.

5. Method according to claim 3, for driving a plurality of $N_{LS}$ light sources, the method comprising the steps of:
dividing the light sources into a first group of m1 light sources, a second group of m2 light sources, and a third group of m3 light sources;
wherein the m1 light sources of the first group are continuously maintained in an ON state, wherein the m2 light sources of the second group are continuously maintained in an OFF state, and wherein the m3 light sources of the third group are switched ON during m of said cell segments and switched OFF during N-m of said cell segments;

wherein $N_{LS}=m1+m2+m3$, m1 being an integer in the range from 0 to $N_{LS}-1$, m2 being an integer in the range from 0 to $N_{LS}-1$, m3 being an integer in the range from 1 to $N_{LS}$;

and wherein m1, m2, m3 are selected such that $$\Delta = \frac{m_1 \cdot N + m_3 \cdot m}{N_{LS} \cdot N}.$$

6. Method according to claim 5, wherein m is an integer in the range from (N-1)/2 to (N+1)/2.

7. Method according to claim 1, comprising the steps of:
defining a time base divided into time cells having a duration Tc;
wherein each time cell is subdivided into N cell segments of mutually equal duration, wherein N is a positive even integer;
grouping the N cell segments into N/2 pairs of cell segments;
defining a duty cycle ratio Δ=m/N, with m being an integer in the range from 1 to N-1;
in each time cell, on the basis of data to be encoded, for each of said pairs, in order to encode a data bit corresponding to such pair, either:
switching the light source ON during the first cell segment of the pair and switching the light source OFF during the second cell segment of the pair, to encode the data bit having a first value, or
switching the light source OFF during the first cell segment of the pair and switching the light source ON during the second cell segment of the pair, to encode the data bit having the first value, or
switching the light source ON during the first cell segment of the pair as well as during the second cell segment of the pair, to encode the data bit having a second value, or
switching the light source OFF during the first cell segment of the pair as well as during the second cell segment of the pair, to encode the data bit having the second value;
wherein the total number of cell segments with the light source ON is equal to m.

8. Method according to claim 7, wherein each pair of cell segments always comprises two neighbouring cell segments.

9. Method according to claim 7, wherein each pair of cell segments always comprises a cell segment i and a cell segment i+N/2, for every i from 1 to N/2.

10. Method according to claim 7, wherein each pair of cell segments always comprises a cell segment i and a cell segment N+1-i, for every i from 1 to N/2.

11. Method according to claim 1, comprising the steps of:
defining a time base divided into time cells having a duration Tc;
wherein each time cell is subdivided into a data cell portion and a duty cycle cell portion;
wherein the data cell portion is subdivided into a plurality of $N_{P1}$ cell segments having a duration Ts;
wherein the duty cycle cell portion is subdivided into two parts;
wherein, in each time cell, on the basis of data to be encoded, a pattern of m of said cell segments of the data cell portion is selected, with m being a fixed integer selected in the range from 1 to $N_{P1}-1$, the pattern representing said data;
wherein the light source is switched ON during said m cell segments in the data cell portion and switched OFF during the remaining $N_{P1}-m$ cell segments in the data cell portion;
wherein the light source is switched ON during the first part of the duty cycle cell portion and switched OFF during the second part of the duty cycle cell portion (P;
wherein the duration of the first part of the duty cycle cell portion is varied in order to vary the duty cycle ratio Δ;
wherein the pattern of m segments is varied to encode different values for one or more bits, the value of m remaining constant for all time cells.

12. Method according to claim 11, wherein the duty cycle cell portion is subdivided into a plurality of cell segments of mutually equal duration, wherein the first part) of the duty cycle cell portion corresponds to a first number $N_{PP1}$ of said cell segments, and wherein the second part of the duty cycle cell portion corresponds to a second number $N_{PP2}$ of said cell segments, with $N_{PP1}+N_{PP2}$ being constant.

13. Method according to claim 12, wherein the duration of the cell segments of the duty cycle cell portion have the same duration as the cell segments of the data cell portion.

14. Method according to claim 11, wherein m equals 1 and $N_{P1}$ equals 2.

15. Method according to claim 11, wherein $N_{P1}$ equals 5 and m equals 1;
wherein, in at least one time cell, the light source is switched ON in the second cell segment of the data cell portion for coding a bit having a first value; and wherein, in at least one other time cell, the light source is switched ON in the fourth cell segment of the data cell portion for coding a bit having a second value different from the first value.

16. Method according to claim 11, wherein $N_{P1}$ equals 4 and m equals 1;
wherein, in at least one time cell, the light source is switched ON in the first cell segment of the data cell portion for coding a bit having a first value; and wherein, in at least one other time cell, the light source is switched ON in the third cell segment of the data cell portion for coding a bit having a second value different from the first value.

17. Method according to claim 11, wherein $N_{P1}$ equals 4 and m equals 1;
wherein, in at least one time cell, the light source is switched ON in the second cell segment of the data cell portion for coding a bit having a first value; and wherein, in at least one other time cell, the light source is switched ON in the fourth cell segment of the data cell portion for coding a bit having a second value different from the first value.

18. Method according to claim 11, wherein $N_{P1}$ equals 4 and m equals 1;
wherein, in at least one time cell, the light source is switched ON in the first cell segment of the data cell portion for coding a first bit having a first value and coding a second bit having a third value;
wherein, in at least one other time cell, the light source is switched ON in the third cell segment of the data cell portion for coding the first bit having a second value different from the first value and coding the second bit having the third value;
wherein, in at least one time cell, the light source is switched ON in the second cell segment of the data cell portion for coding the first bit having one of the first and second values and coding the second bit having a fourth value different from the third value;

and wherein, in at least one other time cell, the light source is switched ON in the fourth cell segment of the data cell portion for coding the first bit having the other one of the first and second values and coding the second bit having the fourth value;

wherein the third value is either constantly equal to the first value or constantly equal to the second value.

19. Method according to claim 11, wherein $N_{P1}$ equals 4 and m equals 2, wherein the four cell segments together define a quad-phase coded dibit.

20. Method according to claim 19, wherein the first and third cell segments are paired to define a bi-phase coded bit, the light source being switched ON in precisely one of said two cell segments and switched OFF in the other one of said two cell segments; and wherein the second and fourth cell segments are paired to define a bi-phase coded bit, the light source being switched ON in precisely one of said two cell segments and switched OFF in the other one of said two cell segments.

21. Method according to claim 19, wherein the data cell portion comprises a plurality of q/2 groups of four consecutive cell segments, wherein q is a multiple of 2, with q≦N/2, wherein the four cell segments of each such group together defining a respective quad-phase coded dibit.

22. Method for driving a light source, wherein the light source is alternately switched ON and OFF in an ON/OFF pattern, wherein the duty cycle of the ON/OFF pattern is varied to vary the average light intensity of the light source, and wherein the shape of the ON/OFF pattern is varied to transmit data, comprising the steps of:
defining a time base divided into time cells having a duration Tc;
wherein each time cell is subdivided into N cell segments of mutually equal duration, wherein N is a positive integer;
defining a duty cycle ratio Δ=m/N, with m being an integer in the range from 1 to N−1;
in each time cell, on the basis of data to be encoded, selecting a pattern of m of said cell segments, the pattern representing said data; and
switching the light source ON during said m of said cell segments and switching the light source OFF during the remaining N−m of said cell segments.

23. Method according to claim 22, wherein the pattern of m segments is varied to encode different values for $$^2\log\binom{N}{m}$$

bits per time cell.

24. Method according to claim 22, for driving a plurality of $N_{LS}$ light sources, the method comprising the step of dividing the light sources into a first group of m1 light sources, a second group of m2 light sources, and a third group of m3 light sources;
wherein the m1 light sources of the first group are continuously maintained in an ON state,
wherein the m2 light sources of the second group are continuously maintained in an OFF state, and wherein the m3 light sources of the third group are switched ON during m of said cell segments and switched OFF during N−m of said cell segments;
wherein $N_{LS}$=m1+m2+m3, m1 being an integer in the range from 0 to $N_{LS}$−1, m2 being an integer in the range from 0 to $N_{LS}$−1, m3 being an integer in the range from 1 to $N_{LS}$; and wherein m1, m2, m3 are selected such that $$\Delta = \frac{m_1 \cdot N + m_3 \cdot m}{N_{LS} \cdot N}.$$

25. Method according to claim 22, wherein m is an integer in the range from (N−1)/2 to (N+1)/2.

26. Method for driving a light source, wherein the light source is alternately switched ON and OFF in an ON/OFF pattern, wherein the duty cycle of the ON/OFF pattern is varied to vary the average light intensity of the light source, and wherein the shape of the ON/OFF pattern is varied to transmit data, comprising the steps of:
defining a time base divided into time cells having a duration Tc;
wherein each time cell is subdivided into N cell segments of mutually equal duration, wherein N is a positive even integer;
grouping the N cell segments into N/2 pairs of cell segments;
defining a duty cycle ratio Δ=m/N, with m being an integer in the range from 1 to N−1;
in each time cell, on the basis of data to be encoded, for each of said pairs, in order to encode a data bit corresponding to such pair, either:
switching the light source ON during the first cell segment of the pair and switching the light source OFF during the second cell segment of the pair, to encode the data bit having a first value, or
switching the light source OFF during the first cell segment of the pair and switching the light source ON during the second cell segment of the pair, to encode the data bit having the first value, or
switching the light source ON during the first cell segment of the pair as well as during the second cell segment of the pair, to encode the data bit having a second value, or
switching the light source OFF during the first cell segment of the pair as well as during the second cell segment of the pair, to encode the data bit having the second value;
wherein the total number of cell segments with the light source ON is equal to m.

27. Method according to claim 26, wherein each pair of cell segments always comprises two neighbouring cell segments.

28. Method according to claim 26, wherein each pair of cell segments always comprises a cell segment i and a cell segment i+N/2, for every i from 1 to N/2.

29. Method according to claim 26, wherein each pair of cell segments always comprises a cell segment i and a cell segment N+1−i, for every i from 1 to N/2.

30. Method for driving a light source, wherein the light source is alternately switched ON and OFF in an ON/OFF pattern, wherein the duty cycle of the ON/OFF pattern is varied to vary the average light intensity of the light source, and wherein the shape of the ON/OFF pattern is varied to transmit data, comprising the steps of:
defining a time base divided into time cells having a duration Tc;
wherein each time cell is subdivided into a data cell portion and a duty cycle cell portion;
wherein the data cell portion is subdivided into a plurality of NP1 cell segments having a duration Ts;
wherein the duty cycle cell portion is subdivided into two parts;
wherein, in each time cell, on the basis of data to be encoded, a pattern of m of said cell segments of the data cell portion is selected, with m being a fixed integer selected in the range from 1 to $N_{P1}-1$, the pattern representing said data;

wherein the light source is switched ON during said m cell segments in the data cell portion and switched OFF during the remaining NP1 m cell segments in the data cell portion;

wherein the light source is switched ON during the first part of the duty cycle cell portion and switched OFF during the second part of the duty cycle cell portion;

wherein the duration of the first part of the duty cycle cell portion is varied in order to vary the duty cycle ratio $\Delta$;

wherein the pattern of m segments is varied to encode different values for one or more bits, the value of m remaining constant for all time cells.

31. Method according to claim 30, wherein the duty cycle cell portion is subdivided into a plurality of cell segments of mutually equal duration, wherein the first part of the duty cycle cell portion corresponds to a first number $N_{PP1}$ of said cell segments, and wherein the second part of the duty cycle cell portion corresponds to a second number $N_{PP2}$ of said cell segments, with $N_{PP1}+N_{PP2}$ being constant.

32. Method according to claim 31, wherein the duration of the cell segments of the duty cycle cell portion have the same duration as the cell segments of the data cell portion.

33. Method according to claim 30, wherein m equals 1 and $N_{P1}$ equals 2.

34. Method according to claim 30, wherein $N_{P1}$ equals 5 and m equals 1;
wherein, in at least one time cell, the light source is switched ON in the second cell segment of the data cell portion for coding a bit having a first value; and wherein, in at least one other time cell, the light source is switched ON in the fourth cell segment of the data cell portion for coding a bit having a second value different from the first value.

35. Method according to claim 30, wherein $N_{P1}$ equals 4 and m equals 1;
wherein, in at least one time cell, the light source is switched ON in the first cell segment of the data cell portion for coding a bit having a first value; and wherein, in at least one other time cell, the light source is switched ON in the third cell segment of the data cell portion for coding a bit having a second value different from the first value.

36. Method according to claim 30, wherein $N_{P1}$ equals 4 and m equals 1;
wherein, in at least one time cell, the light source is switched ON in the second cell segment of the data cell portion for coding a bit having a first value; and wherein, in at least one other time cell, the light source is switched ON in the fourth cell segment of the data cell portion for coding a bit having a second value different from the first value.

* * * * *